United States Patent
Dietze et al.

(10) Patent No.: US 11,958,995 B2
(45) Date of Patent: Apr. 16, 2024

(54) SEALING ADHESIVE TAPE FOR VEHICLE BODIES

(71) Applicant: tesa SE, Norderstedt (DE)

(72) Inventors: Sebastian Dietze, Hamburg (DE); Jasmin Flucke, Hamburg (DE); Uwe Schümann, Pinneberg (DE); Anna Schubert, Hamburg (DE)

(73) Assignee: tesa SE, Norderstedt (DE)

( * ) Notice: Subject to any disclaimer, the term of this patent is extended or adjusted under 35 U.S.C. 154(b) by 895 days.

(21) Appl. No.: 16/646,367

(22) PCT Filed: Aug. 16, 2018

(86) PCT No.: PCT/EP2018/072220
§ 371 (c)(1),
(2) Date: Mar. 11, 2020

(87) PCT Pub. No.: WO2019/052769
PCT Pub. Date: Mar. 21, 2019

(65) Prior Publication Data
US 2020/0270486 A1 Aug. 27, 2020

(30) Foreign Application Priority Data

Sep. 12, 2017 (DE) .......................... 102017216070.5

(51) Int. Cl.
| | | |
|---|---|---|
| *C09J 7/35* | (2018.01) | |
| *C08G 18/32* | (2006.01) | |
| *C08G 18/75* | (2006.01) | |
| *C09J 5/06* | (2006.01) | |
| *C09J 175/14* | (2006.01) | |
| *C08G 18/22* | (2006.01) | |
| *C08K 3/06* | (2006.01) | |

(52) U.S. Cl.
CPC ............ *C09J 7/35* (2018.01); *C08G 18/3206* (2013.01); *C08G 18/758* (2013.01); *C09J 5/06* (2013.01); *C09J 175/14* (2013.01); *C08G 18/227* (2013.01); *C08K 3/06* (2013.01); *C09J 2301/208* (2020.08); *C09J 2301/304* (2020.08); *C09J 2301/408* (2020.08); *C09J 2301/416* (2020.08)

(58) Field of Classification Search
None
See application file for complete search history.

(56) References Cited

U.S. PATENT DOCUMENTS

| | | | |
|---|---|---|---|
| 6,030,701 A * | 2/2000 | Johnson | ..................... C09J 7/35 |
| | | | 428/480 |
| 7,575,653 B2 | 8/2009 | Johnson et al. | |
| 11,208,581 B2 * | 12/2021 | Dietze | ..................... B29B 7/485 |
| 2004/0048060 A1 | 3/2004 | Kassa et al. | |
| 2016/0271866 A1 * | 9/2016 | Niemeyer | ............... B29C 65/48 |
| 2016/0368355 A1 * | 12/2016 | Richert | ..................... C09J 7/241 |

FOREIGN PATENT DOCUMENTS

| | | |
|---|---|---|
| DE | 102013226505 A1 | 6/2015 |
| DE | 102015122438 A1 | 6/2017 |
| DE | 102016218964 A1 | 4/2018 |
| DE | 102016218978 A1 | 4/2018 |
| WO | 2005063907 A1 | 7/2005 |
| WO | 2018059931 A1 | 4/2018 |

OTHER PUBLICATIONS

Overview of materials for Polyethylene Terephthalate (PET). from MatWeb: Materials Property Data (online database). Retrieved Jun. 3, 2023. Retrieved from URL:<[https://www.matweb.com/search/DataSheet.aspxt?MatGUID=a696bdcdff6f41dd98f8eec3599eaa20&ckck=1]> (Year: 2023).*
German Patent and Trademark Office, German Search Report for German Patent Application No. 102017216070.5, dated May 4, 2018.
European Patent Office, International Search Report for PCT Application No. PCT/EP2018/072220, dated Oct. 26, 2018.
European Patent Office, Office Action for European Patent Application No. 18758572.4, dated Jul. 13, 2023, 4 pages.

* cited by examiner

*Primary Examiner* — Sanza L. McClendon
(74) *Attorney, Agent, or Firm* — Price Heneveld LLP

(57) ABSTRACT

A method is provided for sealing discontinuities in vehicle bodywork, using an at least two-layer adhesive product which comprises at least one thermally activatable adhesive layer and a film layer of a polymeric material, where first the adhesive product is positioned with the adhesive layer onto the discontinuity for sealing, the adhesive layer sealingly wets the discontinuity, optionally after temperature increase, at elevated temperature the thermal activation of the adhesive ensues, characterized in that the adhesive layer used comprises a layer of a thermally activatable adhesive, specifically a layer based on a vulcanizable adhesive, and the thermal activation takes place with vulcanization of the adhesive.

20 Claims, No Drawings

SEALING ADHESIVE TAPE FOR VEHICLE BODIES

CROSS-REFERENCE TO RELATED APPLICATIONS

This application is a national stage application under 35 U.S.C. § 371 that claims the benefit of priority under 35 U.S.C. § 365 of International Patent Application Serial No. PCT/EP2018/072220, filed on Aug. 16, 2018, designating the United States of America, which in turn claims the benefit of priority under 35 U.S.C. § 119 of German Patent Application Serial No. 10 2017 216 070.5, filed Sep. 12, 2017, the contents of which are relied upon and incorporated herein by reference in their entirety.

FIELD OF THE DISCLOSURE

The invention relates to a method for sealing discontinuities in vehicle bodywork, using an at least two-layer adhesive product which comprises at least one thermally activatable adhesive layer and a film layer of a polymeric material, where the adhesive product is positioned with the adhesive layer onto the discontinuity for sealing, and the adhesive of the adhesive layer is activated by thermal energy.

BACKGROUND

In the automobile industry the joining of two components—such as, for example, panels or the like—by methods such as riveting, welding, clinching or other processes is a commonplace procedure. Oftentimes, too, different processes are combined with one another—for instance, the production of a beaded seam, which is then strengthened subsequently with spot welds or rivets.

In the manufacture of auto bodywork, a regular feature of such sites where two panels start, or of other sites, are discontinuities in the bodywork surface. For instance, rivet sites, weld seams, beaded seams, offset sites, and the like represent potential sites of attack for moisture, contaminants, and the like, leading to increased susceptibility of these sites to rust.

To reduce this susceptibility, such discontinuities in the surface are commonly proofed and sealed, by application, for instance, of suitable sealants or sealing compounds. These compounds may for instance be of a kind which cure after application and so afford sufficient surface protection.

Further possible irregularities in the automobile bodywork may be process-related gaps and holes in the panel, at positions, for instance, where retainers were mounted to the panel in the process, and removed again after use. In some cases holes are also made in the panels subsequently, for the purpose, for instance, of providing paint or corrosion protection to regions behind the panel.

Aside from the fact that such holes also constitute sites of attack for harmful influences, it is oftentimes desirable for such holes as well to be subsequently sealed, since here, for example, in the case of foaming-out steps, the foam might unintentionally escape. Here as well, sealants or sealing compounds are regularly employed.

Sealants or sealing compounds of similar kind may also be used, however, to compensate unevennesses in the bodywork surface, such as dents or the like.

Sealing sites of this kind are then intended, however, not to permanently impair the external appearance of the vehicle, and accordingly the seal is not only to have a smooth, regular outward appearance but also to be suitable for painting.

In practice, sealing is increasingly being carried out using adhesive films or adhesive strips which have a surface which, after bonding, can be painted or otherwise visually adapted. The adhesives used in this context include thermosetting adhesive systems.

U.S. Pat. No. 7,575,653 B describes a method for using a sheetlike material, which can be made to flow by melting, in order to provide the surface of a substrate, especially from the automobile industry, with protective and esthetic features. The sheetlike material in this case is positioned over the substrate and heated, to bring about sufficient softening. The material softens, covers the site to be sealed, becomes sticky in the further course of heating, and bonds durably on the substrate surface. The material cures in the course of heating. The unprotected surface of the hardened material can subsequently be painted.

US 2004/0048060 A describes a system for sealing panels that consists of multiple layers, namely a softenable layer of adhesive which is capable of flow under heat, and a barrier layer for fixing the layer of adhesive in use, said barrier layer comprising crystalline and amorphous fractions. Further layers may be provided. A disadvantage of the layered products used here is the relatively high layer thickness.

Accordingly, there is a need to provide a method by which vehicle bodywork discontinuities can be provided with seals which have particularly uniform surfaces. The seals are intended preferably to possess good low-temperature stability. The desired method is intended advantageously to enable seals in a wide variety of thicknesses—that is, not only thick-layer seals but also thinner sealing layers.

SUMMARY OF THE DISCLOSURE

The object is achieved through the use of thermally vulcanizable adhesives as an adhesive layer for adhesive sealing tapes.

The invention accordingly relates in particular to a method for sealing discontinuities in vehicle bodywork, using an at least two-layer adhesive product which comprises at least one thermally activatable adhesive layer and also a film layer of a polymeric material, where first the adhesive product is positioned with the adhesive layer onto the discontinuity for sealing, where further the adhesive layer sealingly wets the discontinuity, optionally after temperature increase, where the adhesive of the adhesive layer is activated by thermal energy, the thermal activation of the adhesive ensuing at a temperature increased relative to the positioning temperature (where the positioning temperature may for example be room temperature, 23° C.). The elevated temperature may be brought about by the temperature increase carried out optionally in the course of the sealing wetting and/or by temperature increase—including, in particular, higher temperature increase—carried out thereafter. The adhesive layer used comprises a layer of a thermally activatable adhesive, specifically a layer based on a thermally vulcanizable adhesive, and so the thermal activation takes place with vulcanization of the adhesive. The vulcanization causes curing of the layer of adhesive, and so after cooling there is a solid sealing layer present on the discontinuity. The temperature during thermal activation may advantageously be higher than the temperature during the sealing wetting.

DETAILED DESCRIPTION OF THE PREFERRED EMBODIMENTS

The method of the invention therefore embraces in particular the positioning of an adhesive product, comprising a layer of a softenable adhesive, over a substrate, and the heating of the adhesive product in order to bring about sufficient softening of the adhesive, so that the adhesive product bonds to the substrate. In the course of heating, the adhesive product conforms to the surface of the substrate. In the course of the heating, the stickiness of the adhesive is sufficient to sufficiently wet the substrate surface and cause the adhesive product to bond to it. In the course of the heating, in particular, the adhesive cures. The adhesive product is preferably of two-layer or multilayer construction and comprises at least one upper film layer, which in turn may be softenable in configuration. The upper film layer masks the eventual bond site outwardly.

Especially where the application is that of sealing of irregularities in vehicle bodywork, the sealing may be accomplished together with the curing of the paint in the baking chamber (also called baking oven or paint baking oven). In customary painting operations on present-day bodywork, the paint is applied to the target bodywork—which in general has been pretreated accordingly—, followed by transfer into a baking chamber, in which the bodywork is subjected to a certain temperature program, in the course of which the paint cures. This process may be repeated multiply for multiple paint films. An example of such a temperature program might involve the bodywork being exposed first to a temperature of 80° C. for 10 minutes and then to a temperature of 160° C. for 20 minutes. Other temperature programs are customary, and temperatures of 80° C. to 180° C. are customary. The term "temperature program" in the meaning of this specification also embraces the application of a single temperature for a certain time.

Prior to the actual painting procedure, the bodywork is typically pretreated, by electrophoretic deposition (EPD) for instance. In the source of this industrially widespread process, colloidal particles are deposited under the influence of an electrical field on the bodywork, which is connected as an electrode. Commonplace methods are those of cathodic electrocoating (CEC) or anodic electrocoating (AEC).

In one advantageous procedure, the adhesive product is applied to the discontinuity in the bodywork pretreated by CEC or AEC; the bodywork is then provided with a paint film and transferred into the baking chamber, where it is subjected to a temperature program, and then the softening, the flow of the adhesive layer onto the sealing site, and the activation of the vulcanization take place in the baking chamber at a temperature prevailing there.

Discontinuities in the context of this specification are understood to be either intended or unintended effects in surfaces belonging to the bodywork, for which sealing and/or visual enhancement is desired. Discontinuities may be construction-related (such as seam sites, for example) or attributable to other causes.

The term "adhesive product" in the sense of the present specification embraces all shape structures—especially those which are substantially two-dimensional—that are suitable for the specified bonding purpose, such as, for example, adhesive films, adhesive strips, adhesive tapes, labels, diecuts, sections, and the like. The extent of the adhesive product in one of the directions in space ("thickness" of the adhesive product) is typically substantially lower than in the two directions in space (length, width) that are perpendicular to it; the resulting product, then, is a substantially flat product. Length and width of the adhesive product may in their turn likewise deviate considerably from one another (in the case of striplike or tapelike adhesive products, for example), but may also be in the same order of magnitude. The adhesive products may in principle adopt any desired geometric—especially sheetlike—form, being for example—without any intention to impose limitation—square, rectangular, rhomboid, round, oval, elongate, frame-shaped, mirror-symmetrical, point-symmetrical in converted form, or else irregularly configured. The specific configuration of the adhesive product is adapted preferably for the particular end use and adapted to the discontinuity which is to be sealed.

The term "adhesive" in the context of this specification stands for a composition which is suitable for bringing about by a process of adhesive bonding, ultimately, a sufficiently strong anchorage of a first substrate (a first adherend) on a second substrate (a second adherend). This is in line with the definition of an adhesive according to DIN EN 923: 2008-06, whereby adhesives are defined as nonmetallic substances which join adherends by face attachment (adhesion) and internal strength (cohesion). In accordance with the invention, one of the substrates may also be a layer of an adhesive product whose constituent is also said adhesive layer. In particular, the term "adhesive" does not require it to have self-adhesive properties at room temperature, though it certainly includes this possibility. The term "adhesive" in the context of this specification stands in principle both for compositions which produce weak bonds and also for those which produce reversible bonds, and for those which produce bonds which cannot be parted again without destruction, and for those which produce bonds having strengths between the stated conditions.

The adhesive product is of at least two-layer form. In one preferred embodiment, the two layers represent the only constituents of the adhesive product, and so it has precisely two layers. In further, variant embodiments, there are additional layers present, disposed in particular between the thermally activatable adhesive layer and the film layer of a polymeric material, though in principle they may also be located elsewhere in the adhesive product. Such layers may be, for example, anchorage mediators, reinforcing layers, functional layers, and the like. In one variant embodiment the adhesive product is of three-layer construction, thus comprising precisely one further layer, which in particular may be disposed between thermally activatable adhesive layer and film layer of polymeric material, but alternatively, for example, on that side of the film layer that faces away from the adhesive layer.

In an advantageous procedure, the thermally activatable adhesive is softenable in use, thus experiencing a reduction in viscosity through supply of thermal energy. This ensures that on the one hand the adhesive product in application—especially at room temperature—can be outstandingly handled, owing to sufficient dimensional stability of the layers. At the same time it ensures that the adhesive on heating flows well onto the surface for sealing, providing it on the one hand with sealing, but on the other hand also flowing well onto it and hence producing effective fixing on the substrate.

The term "softenable in use", as used herein, is to be understood according to the following passage. Polymeric materials, especially of amorphous or semicrystalline structure, take on different states depending on the temperature, which may be characterized substantially as follows. At low temperatures the glass state is present. Here, the material is brittle; the glass state may be interpreted as a subcooled, frozen liquid. When the temperature is raised, a glass transition region is traversed, in which the mechanical behavior of the material changes substantially. When the glass transition temperature, $T_g$, is exceeded, a solid glass or polymer transitions into a rubberlike to high-viscosity state; this range is characterized in that the chains of the molecule are mobile, without the plastic undergoing direct liquefaction. In the case of amorphous and semicrystalline plastics, therefore, the glass transition separates the underlying, brittle, energy-elastic region (glass region) from the overlying, soft, entropy-elastic region (referred to below as "rubber-elastic region"). Semicrystalline materials generally possess in addition a melting temperature at which the crystalline regions melt. On further increasing the temperature, the rubber-elastic region transitions to the fluid region, in which the material liquefies, and is therefore present at lower viscosity thereafter. This transition from the rubber-elastic region into the fluid region is referred to below in the context of this specification as "softening". This characterization is part of the common general knowledge and is described comprehensively in relevant textbooks.

The tendency of polymeric compositions toward softening may be characterized by their behavior on mechanical stressing. The response to such loading may be resilience (elasticity; elastic component of the substance) and/or flow (permanent deformation; viscous fraction of the substance).

All liquids and solids may be considered as viscoelastic materials, in that they have partially elastic and partially viscous behavior. For the more precise description and quantification of the degree of elastic and viscous components and also of the ratio of the components to one another, it is possible to employ the variables of storage modulus (G') and loss modulus (G"), which can be ascertained using Dynamic Mechanical Analysis (DMA). G' is a measure of the elastic component and G" a measure of the viscous component of a substance. The two variables are dependent on the deformation frequency and the temperature. In the limiting case of liquids of ideal viscosity (Newtonian fluids), the storage modulus G' is very small relative to the loss modulus G"; with solids of ideal elasticity, conforming to Hooke's law, the loss modulus G" is very small relative to the storage modulus G'. If the storage modulus is significantly greater than the loss modulus, the substances are said to be solids; in the opposite case, liquids. Accordingly, the transition from solid state to liquid state for a composition when it is heated can be characterized by the value at which storage modulus and loss modulus take on the same value. For the rubber-elastic range it is also the case that G"<G', and so the profiles of G' and G", plotted as a function of temperature, intersect one another at the point of transition from the rubber-elastic region into the fluid region.

The variables of storage modulus and loss modulus can be ascertained by DMA, using a rheometer, and can be plotted as a function of temperature, as mentioned above. In this case the material for investigation, in the form of a plane-parallel layer, for example, is exposed in a plate/plate arrangement to a sinusoidally oscillating shearing stress. In the case of instruments operating with shear stress control, the deformation as a function of time, and the temporal offset of this deformation relative to the introduction of the shear stress, are measured. This temporal offset is referred to as phase angle δ. The storage modulus G' is defined as follows: $G'=(\tau/\gamma)*\cos(\delta)$ (τ=shear stress, γ=deformation, δphase angle=phase shift between shear stress vector and deformation vector). The definition of the loss modulus G" runs as follows: $G''=(\tau/\gamma)*\sin(\delta)$ (τ=shear stress, γ=deformation, δ=phase angle=phase shift between shear stress vector and deformation vector).

From the ratio of the two variables G' and G" to one another (characterized by the loss factor tan δ=(G"/G')) at a particular temperature (at room temperature, for example) it is possible to draw conclusions about the viscoelastic behavior of the substance at the respective temperature; from the plot of storage modulus (G') and loss modulus (G") or the loss factor tan δ of a substance against the temperature, and from the relation of the two curves to one another, conclusions can be drawn about the softening behavior.

At low temperatures (in the rubber-elastic range) the flow behavior is generally low by comparison with the elastic behavior, correspondingly, G"<G'. When the temperature is increased, the loss modulus for softenable substances reaches the value of the shear modulus (and so G'=G"), and on further increase in temperature the profile of the loss modulus is above that of the shear modulus and may also climb more strongly than the latter. The temperature $T_{Erw}$ at which, during the softening process (that is, on transition from the rubber-elastic range into the fluid range) of a composition, the value—also identified as loss factor –tan δ=(G"/G')=1 may therefore be understood as a characteristic measure of temperatures at which softening occurs (below, $T_{Erw}$ is also referred to as "softening point").

A composition is characterized for the purposes of this specification as "softenable in use", also referred to below with the same meaning simply as "softenable", when, in the dynamic mechanical analysis, for a given deformation frequency, on stepwise temperature increase, the loss modulus G" and the shear modulus G' adopt the same value during the softening process of the composition, up to a maximum temperature favorable for the use according to the invention (when, that is, the softening point $T_{Erw}$ (with tan δ=(G"/G')=1) is below or equal to this maximum temperature).

For the thermally vulcanizable adhesive, the following passage is then especially relevant. Adhesives used preferably in accordance with the invention are those which are softenable to the extent that on stepwise temperature increase and on the basis of the softening process (that is, on transition from the rubber-elastic range into the fluid range) at a deformation frequency of 10 rad/s, the loss modulus G" and the shear modulus G', below the maximum process temperature $T_{P,max}$, adopt the same value, in particular at not more than 100° C., more preferably at not more than 75° C., very preferably at not more than 60° C. In other words it is the case that for $T_{Erw,K}$, at which tan δ=G"/G'=1 on transition from the rubber-elastic range into the fluid range, advantageously $T_{Erw,K} \leq T_{P,max}$, preferably $T_{Erw,K} \leq 100°$ C., more preferably $T_{Erw,K} \leq 75°$ C., very preferably $T_{Erw,K} \leq 60°$ C. With further preference the adhesives are selected such that the temperature value $T_{Erw,K}$, at which the loss modulus G" and the shear modulus G' adopt the same value under the measuring conditions specified above, is not lower than 20° C., especially preferably not lower than 30° C.; that is, preferably, for the temperature $T_{Erw,K}$ (tan δ=G"/G'=1) on transition from the rubber-elastic range into the fluid range, it is the case that advantageously $T_{Erw,K} \geq 20°$ C., preferably $T_{Erw,K} \geq 30°$ C., so that the adhesive product is readily manageable at room temperature. The specified values pertain to the measurement by Dynamic Mechanical Analysis (DMA); plate/plate arrangement, sinusoidally oscillating shear stress (deformation frequency) 10 rad/s, step width of the measurement values 2.5° C.—see DIN EN ISO 6721-1. The start temperature and end temperature of the measurement are selected such that the softening range is within the chosen temperature window (for example, of −60° C. to +160° C.).

Because the adhesive is a thermally activatable adhesive, for which further supply of energy brings about crosslinking (vulcanization), the viscosity is generally increased again earlier or later after the onset of crosslinking, and so for adhesives of the invention a curve in which the viscosity is plotted against the temperature of the adhesive customarily passes through a minimum. The plot of shear modulus and loss modulus as a function of the temperature may take a corresponding profile for crosslinkable adhesives: in the rubberlike range ("solid") G'>G", and both curves fall with increasing temperature. On softening, there is a transition from the rubberlike range into the fluid melt range, and in the latter G">G'. The temperature $T_{Erw,K}$ for which G'=G" is considered to be a characteristic variable for the softening behavior (softening point of the adhesive). Accordingly, if the loss factor tan δ is plotted against the temperature, this curve takes on a value of 1 at the temperature $T_{Erw}$. If the temperature is increased further, the incipient crosslinking at higher temperatures may result in an increase in viscosity again, and the curves of the loss modulus G" and the shear modulus G' each pass through a minimum and climb again. It is possible here for the two curves to intersect again—that is, for the loss factor tan δ to again take on a value of 1. The renewed transition into a solid state then coincides with the formation of an internal network. Serving as softening point $T_{Erw,K}$ in order to characterize the softening of the adhesive, therefore, is the temperature at the transition of the rubberlike range into the fluid range, at which tan δ=G"/G'=1, if in the plot of tan δ against the temperature there are a plurality of points which meet this condition.

As mentioned above it is advantageous if at the temperature of use the thermally activatable adhesive layer softens, so that it effectively wets and conforms to the irregularity to be sealed, but without its viscosity becoming too low. In order to be able to establish outstandingly suitable viscosities in the melt, especially in order to prevent too sharp a reduction in the viscosity and the associated flow of the adhesive out of the sealing site, it can be very advantageous to add rheology modifiers to the thermally activatable adhesive. Rheology modifiers, however, can also be omitted, especially if the thermally activatable adhesive in the melt already has inherently good viscosity properties. In one advantageous variant of the invention, accordingly, the thermally activatable adhesive comprises one or more rheology modifiers. Customary amounts of rheological assistants are up to 30 wt %, preferably up to 20 wt %, more preferably up to 10 wt %, based on the blended adhesive.

Rheology modifiers which can be used are in principle all suitable rheology modifiers as described in the prior art. Compatibility with the adhesive ought to be borne in mind. The rheology modifiers that can be used may be organic or inorganic and may be liquid or solid. Suitable rheology modifiers in the invention are, in particular, polyamide waxes, clay minerals, phyllosilicates, fumed silicas, precipitated silica and/or synthetic rheological additives, such as castor oil derivatives, modified castor oil derivatives, polyolefins, and hybrids of the aforesaid.

Advantageous as rheology modifiers are polymers, examples being olefinic polymers—such as, for example, polymers based on ethylene, butylene, propylene or a higher hydrocarbon—, styrene-based polymers—such as, for example, styrene-butadiene polymers. Also possible for use in principle are polymers based on acrylic acid, methacrylic acid or other unsaturated carboxylic acids, or based on esters of the aforesaid acids—such as, for example, acrylates, methacrylates, mixtures of acrylates and methacrylates—, polymers based on acetates—such as, for example, ethylene-vinyl acetate.

Where two or more rheology modifiers are used, they may in principle be selected, independently of one another, from the aforesaid groups of compounds and/or other classes of compound.

The thermally activatable adhesive layer of the adhesive product of the method of the invention is formed from a thermally activatable adhesive which comprises one or more polymers as polymer component and also additives. This sole polymer or this polymer composition (in the case of multiple polymers) may already inherently provide the properties required for the adhesive, and so in a first variant, apart from the polymer component as additive, there is only at least one vulcanizing agent present. In a modification of the first configuration, there are additionally one or more further vulcanizing agents and/or vulcanization accelerators admixed. The simplest configuration of the first variant of a thermally activatable adhesive is formed by exactly one vulcanizable polymer and exactly one vulcanizing agent.

In order to formulate favorably the properties of the thermally activatable adhesive, it may, in another configuration of the invention, have been admixed with one or more further additives, in different combinations and proportions, especially as is elucidated in more detail hereinafter. In accordance with their function in the thermally activatable adhesive, advantageous additives are summarized in groups hereinafter, in the context of the further elucidation, and in terms of content these groups may also overlap with one another, especially if certain additives are capable of modifying different properties of the adhesive.

The bond strength of the adhesive product used in the invention at the sealing site ought at least to be such that the attempt at a violent detachment leads to cohesive fracture in the adhesive layer, but not to adhesive fracture (detachment of the adhesive layer from the substrate). It has been possible to achieve this objective with the adhesive products described in accordance with the invention as part of this specification.

Vulcanization in the sense of the present invention refers to crosslinking processes wherein there is covalent bridging between the polymer chains of rubbers or rubberlike unsaturated or saturated polymers, with generally at least one vulcanizing agent being used. In this case it is possible to employ natural rubber and/or synthetic rubbers and/or rubberlike polymers. Rubbers and rubberlike polymers are understood to be noncrosslinked or partially crosslinked but crosslinkable (vulcanizable) polymers having rubber-elastic properties at 20° C. The crosslinkable polymer is typically an elastomeric polymer. The polymer customarily possesses a low degree of crystallinity and does not have a defined melting point, as is the case with thermoplastic polymers, for example. With particular preference the crosslinkable polymer is amorphous.

The vulcanization reaction of the invention is especially preferably one from the following list:
  (a) Reaction of elemental sulfur as vulcanizing agent with double bonds in the main chain and/or in the side chain (presence of allyl hydrogen atoms) of the crosslinkable polymer
  (b) Reaction of sulfur from sulfur-accelerator systems and/or sulfur donor systems with double bonds in the main chain and/or in the side chain (presence of allyl hydrogen atoms) of the crosslinkable polymer (c) Reactions of radicals, especially formed by means of peroxides, with the crosslinkable polymer (d) Reactions of bifunctional compounds, such as, in particular, polyvalent metal oxides, with reactive groups of the crosslinkable polymer The method of the invention may also be performed advantageously with two or more vulcanization reactions from the list above.

In accordance with the invention the thermally activatable adhesive layer is based on a thermally vulcanizable adhesive, which for that purpose comprises one or more vulcanizable polymers as polymer component. Employed as polymer component here is, in particular, a rubber or a mixture of two or more rubbers (selectable independently of one another). Rubbers preferred in the invention are those of the groups R (with double bond(s) in the main chain) and/or M (with saturated main chain) and/or Q (with siloxane groups in the main chain). Very preferably the polymer component of the vulcanizable adhesive comprises one or more rubbers selected from the group formed of natural rubber, isoprene-based synthetic rubbers, ethylene-propylene-based rubbers, butadiene-based rubbers and silicone-based rubbers.

In a preferred procedure of the method of the invention, vulcanizing agents are added to the thermally vulcanizable adhesive. Vulcanizing agents are the polyfunctional reagents used as crosslinkers in the vulcanization. In the invention, as vulcanizing agents, preferably one or more substances are selected independently of one another from the group formed by sulfur, sulfur-containing compounds (hereinafter also called sulfur donors), peroxides and metal oxides. In one embodiment of the invention, exactly one vulcanizing agent is used, especially selected from the above-specified group, without the adhesive comprising further vulcanizing agents or vulcanization accelerators. In another version of the invention, the adhesive comprises two or more compounds of the kind described within this specification as vulcanizing agents and/or vulcanization accelerators; in that case preferably at least one of the compounds is selected from the above-specified group of vulcanizing agents.

Sulfur as a vulcanizing agent in accordance with the invention can be used alone or in combination with other vulcanizing agents or vulcanizing assistants (especially vulcanization accelerators and/or vulcanization retarders). Sulfur is an especially suitable vulcanizing agent when the polymer for crosslinking has double bonds in the main chain and/or in the side chain, hence possessing allyl hydrogen atoms. Depending on the sulfur modification used and the polymer component to be crosslinked, the sulfur may be solid or liquid and may be soluble or insoluble in the polymer component. Where the sulfur is distributed homogeneously in the polymer component, the choice of modification used generally has no influence over the crosslinking reaction. Solid sulfur is used primarily in finely ground form, in order to ensure very homogeneous distribution in the polymer to be crosslinked.

Where sulfur donors are used as sulfur sources in the sense of vulcanizing agents, they may be utilized additionally or alternatively to elemental sulfur. The replacement of elemental sulfur by sulfur donors may be advantageous, for example, for controlling the vulcanization, in respect of rate, crosslinking yield or crosslinking density, for example, or, for instance, when elemental sulfur is disruptive to the products (on the basis, for instance, of unwanted associated discolorations). Especially suitable sulfur donors are organic compounds which comprise sulfur in a thermally labile form and are able to transfer it in the course of the vulcanization. Examples of suitable sulfur donors are disulfides or tetrasulfides. Sulfur donors with an accelerating effect on the vulcanization reaction can be used, as can those without accelerating effect. Suitable sulfur donors include 2-morpholinodithiobenzothiazole (MBSS), 2-benzothiazoledithio-N-morpholine (MBDS) N,N'-dithiodimorpholine (DTDM) and caprolactam disulfide (CLD). Other suitable sulfur donors for use as vulcanizing agents include, for example, those called ultra accelerators, of the kind described in more detail later on below as vulcanization accelerators. To activate the crosslinking reaction with sulfur donors it is advantageous to add zinc oxide and/or stearic acid.

The vulcanizable adhesive may optionally have been admixed not only with the at least one vulcanizing agent but also with vulcanization accelerators, especially if a sulfur vulcanization (with elemental sulfur and/or sulfur donors) is carried out. Vulcanization accelerators which may optionally be present in the adhesive are understood in this specification to be all substances known to accelerate vulcanization. They may at the same time be sulfur donors as well. Included in the concept of the invention are those known sulfur donors which in the technical literature are not explicitly also classified simultaneously as accelerators.

The most important vulcanization accelerators can be placed into the following known classes of substances: mercapto accelerators, sulfenamide accelerators, sulfenimide accelerators, thiuram accelerators, dithiocarbamate accelerators, dithiocarbamylsulfenamide accelerators, xanthogenate accelerators, guanidine accelerators, amine accelerators, thiourea accelerators, dithiophosphate accelerators, and sulfur donors.

Examples of mercapto accelerators are 2-mercaptobenzothiazole (MBT), zinc 2-mercaptobenzothiazole (ZMBT) and dibenzothiazyl disulfide (MBTS). Typical sulfenamide accelerators are N-cyclohexyl-2-benzothiazolesulfenamide (CBS), N-tert-butyl-2-benzothiazolesulfenamide (TBBS), N-oxydiethylene-2-benzothiazolesulfenamide (MBS) and N,N'-dicyclohexyl-2-benzothiazolesulfenamide (DCBS). An example of a sulfenimide accelerator is N-tert-butyl-2-benzothiazolesulfenimide. Examples of thiuram accelerators are tetramethylthiuram monosulfide (TMTM), tetramethylthiuram disulfide (TMTD), tetraethylthiuram disulfide (TETD), tetrabenzylthiuram disulfide (TBzTD), tetraisopropylthiuram disulfide (TiPTD), dimethyldiphenylthiuram disulfide (MPTD) and dipentamethylenethiuram tetrasulfide (DPTT). Zinc dimethyldithiocarbamate (ZDMC), zinc diethyldithiocarbamate (ZDEC), zinc dibutyldithiocarbamate (ZDBC), zinc pentamethylenedithiocarbamate (Z5MC), zinc ethylphenyldithiocarbamate (ZEPC), zinc dibenzyldithiocarbamate (ZBEC), zinc diisopropyldithiocarbamate (ZDIPC), piperidine pentamethylenedithiocarbamate (PPC), tellurium dimethyldithiocarbamate (TDMC), tellurium diethyldithiocarbamate (TDEC), lead dimethyldithiocarbamate (PbDMC), copper dimethyldithiocarbamate (CuDMC), copper dibutyldithiocarbamate (CuDBC), bismuth dimethyldithiocarbamate (BiDMC) and sodium dimethyldithiocarbamate (NaDMC) represent a selection of known dithiocarbamate accelerators. Typical dithiocarbamylsulfenamide accelerators are N-oxydiethylenedithiocarbamyl-N'-oxydiethylenesulfenamide (OTOS) and N-oxydiethylenedithiocarbamyl-N'-tert-butylsulfenamide (OTTBS). Known examples of xanthogenate accelerators are zinc isopropylxanthogenate (ZIX), zinc butylxanthogenate (ZBX), sodium isopropylxanthogenate (NaIX) and polyxanthogenate. Typical guanidine accelerators are diphenylguanidine (DPG), di-o-tolylguanidine (DOTG) and o-tolyl biguanide (OTBG). Amine accelerators are, for example, butyraldehydeaniline (BAA), tricrotonylidenetetramine (TCT), hexamethylenetetramine (HEXA), polyethylene polyamines (PEP) and also cyclohexylethylamine (CEA). N,N'-Ethylenethiourea (ETU), N,N'-dibutylthiourea (DBTU), N,N'-diethylthiourea (DETU) and N,N'-diphenylthiourea (DPTU) are examples of thiourea accelerators. Known dithiophosphate accelerators are zinc dibutyldithiophosphate (ZBPD), zinc diisooctyldithiophosphate (ZOPD), dodecyl-ammonium diisooctyldithiophosphate (AOPD) and copper diisopropyldithiophosphate (CuPPD).

Sulfur donors which can be used as vulcanization accelerators include 2-morpholinodithio-benzothiazole (MBSS), 2-benzothiazoledithio-N-morpholine (MBDS), N,N'-dithiodimorpholine (DTDM) and caprolactam disulfide (CLD). In general the knowledge concerning vulcanization accelerators is part of the prior art and is set out for example in "Werner Hoffmann, Heinz Gupta, Handbuch der Kautschuk-Technologie (2001)" (section 7.3.2 Sulfur and sulfur-containing vulcanizing agents).

Preferred classes of substance are mercapto accelerators, thiuram accelerators and dithiocarbamate accelerators. Mercapto accelerators are considered to be "all-purpose" accelerators, which in the temperature range from 130° C. to 180° C. ensure rapid vulcanization and have no adverse effect on the stability of the as yet unvulcanized adhesive. The presently described sealing method may also advantageously utilize the effect of these accelerators which applies even below the specified temperature range. The thiuram accelerators and dithiocarbamate accelerators are regarded, individually or in combination, or else in combination with the mercapto accelerators, as being "ultra accelerators", which ensure rapid vulcanization even at temperatures upward of 130° C., while nevertheless ensuring sufficient stability during the preparation of the adhesive, even at compounding temperatures of up to around 90° C., and during the subsequent storage at temperatures between room temperature and 30° C. A preferred all-purpose vulcanization accelerator is MBTS. Preferred ultra accelerators are TBzTD and ZBEC. As well as technical-functional aspects, selection is also governed by the safety aspect in relation to the possible release of hazardous, carcinogenic cleavage products, especially carcinogenic N-nitrosamines. In this regard, MBTS, TBzTD and ZBEC are considered to be uncritical.

Where present, preferred concentrations of the vulcanization accelerators in the thermally vulcanizable adhesive amount together to between at least 0.1 percent by weight and at most 15.0 percent by weight, more preferably between at least 0.5 and at most 12.5 percent by weight, more preferably between at least 1.0 and at most 10.0 percent by weight.

In order to accelerate the vulcanization further, it is also possible as and when required to add vulcanization auxiliaries and adjuvants such as, for example, metal oxides, especially zinc oxide, fatty acids, such as, for example, stearic acid, or salts thereof. In terms of the stability of the as yet unvulcanized adhesive and in relation to the adhesion properties after vulcanization, especially on oiled metal panels, the use of vulcanization auxiliaries and adjuvants has proven fairly critical, and so preferred embodiments are free from these substances.

Where radical initiators are used as vulcanizing agents—preferably these are peroxides—the reaction is initiated more particularly by the thermal decomposition of the radical initiator—particularly the peroxide. The radical reaction (radical transfer) may take place with double bonds in the main chain and/or side chain (especially by addition across the double bond) and with saturated structural elements of the polymer (especially by substitution of a hydrogen atom), and so radical initiators such as peroxides can be used to vulcanize both saturated and unsaturated crosslinkable polymers. Where these reactions compete with one another in unsaturated polymers, the stability of the radicals formed respectively during the reactions contributes to the probability of their occurrence. Peroxides suitable in the invention as vulcanizing agents are, in particular, organic peroxides, and here more preferably dialkyl peroxides, alkyl aryl peroxides, diaryl peroxides, alkyl esters of peracids, aryl esters of peracids, diacyl peroxides and polyvalent peroxides. Many peroxides which could be used as initiators for radical polymerization, such as hydroperoxides, for example, are conversely less suitable for vulcanization, and are therefore preferably shunned. A number of peroxides particularly suitable in the invention are di-t-butyl peroxide (DTBP), 2,5-dimethyl-2,5-di(t-butylperoxy)hexane (DTBPH), dicumyl peroxide (DCP), t-butyl cumyl peroxide (TBCP), t-butyl peroxybenzoate (TBB), dibenzoyl peroxide (DBP), 1,1-di(t-butylperoxy)-3,3,5-trimethylcyclohexane (TBPTC), and bis(t-butylperoxy)di-isopropylbenzene (TBPDB), to name but a few.

As coagents it is possible for the vulcanizable adhesive—especially for those vulcanizing reactions in which radical initiators, such as peroxides in particular, are used as vulcanizing agents—to have been admixed advantageously, and/or to be admixed in the course of the reaction, with those polyfunctional compounds, which react with polymer radicals and in particular form stable radicals (radical stabilizers). This leads in general to an increase in the crosslinking yield. Examples of coagents suitable in the invention are sulfur, polyunsaturated organic compounds—for example, diacrylates, dimaleimides, triallyl compounds—and unsaturated polymers of low molar mass—as for example 1,2-polybutylene, (E)-polyoctenamers. Other radical stabilizers which can be used are sterically hindered phenols. Very suitable coagents are ethylene glycol dimethylacrylate (EDMA), trimethylolpropane trimethacrylate (TMPTMA), N,N'-m-phenylenebismaleimide (MPBM), diallyl terephthalate (DATP), triallyl cyanurate (TAC), 1,6-hexanediol diacrylate (HDDA), to give only a few examples. In an alternative procedure, however, it is also possible to forgo coagents in the vulcanizable adhesive, since they are not absolutely necessary for the success of the radical vulcanization.

The thermally activatable adhesive layer is intended to soften at the temperature of use, so that it effectively wets and conforms to the irregularity that is to be sealed, but without becoming of such low viscosity that it runs off uncontrolledly. For this purpose it is advantageous in the invention to use a thermally activatable adhesive which in terms of its flow properties provides high suitability or for which effective flow properties can be brought about through suitable additization.

The design of the thermally activatable adhesive layer may be such that it is or is not a pressure-sensitive adhesive at room temperature; for positioning on the irregularity, it is advantageous if it is of a pressure-sensitive adhesive design.

Pressure-sensitive adhesiveness is that property of a substance whereby it enters, even under relatively weak applied pressure, into a permanent bond with a substrate. Substances possessing this quality are termed pressure-sensitive adhesives (PSAs). The history of PSAs is a long one. Oftentimes they can after use be detached from the substrate again substantially without residue. PSAs generally have a permanent intrinsic tack at room temperature, thus having a certain viscosity and initial stickiness, so that they wet the surface of the respective substrate even under low applied pressure. The capacity of a PSA to attach to materials and to transmit forces derives from the adhesiveness and the cohesion of the PSA.

PSAs may be considered to be liquids of extremely high viscosity with an elastic component. PSAs, accordingly, have particular, characteristic viscoelastic properties, which result in permanent inherent tack and adhesiveness.

A characteristic of PSAs is that when they are mechanically deformed, there are processes of viscous flow and there is the development of elastic forces of resilience. In terms of their respective proportion, the two processes are in a particular ratio to one another, which is dependent not only on the precise composition, the structure and the degree of crosslinking of the respective PSA but also on the rate and duration of the deformation, and on the temperature too.

The proportional viscous flow is necessary for the attainment of adhesion. Only the viscous components, brought about by macromolecules with relatively high mobility, enable effective wetting and effective flow onto the substrate to be bonded. A high proportion of viscous flow leads to high pressure-sensitive adhesiveness (also referred to as tack or surface stickiness) and hence often also to a high peel adhesion. Highly crosslinked systems, crystalline polymers or those with glasslike solidification have little pressure-sensitive adhesiveness at best, or none, in general, owing to a lack of flowable components.

The proportional forces of elastic resilience are necessary to the attainment of cohesion. They are brought about, for example, by very long-chain macromolecules with high degrees of coiling, and also by physically or chemically crosslinked macromolecules, and they enable the transmission of the forces which act on an adhesive bond. They mean that an adhesive bond is able to withstand a long-term load acting on it, in the form, for example, of a sustained shearing load, to a sufficient extent over a relatively long time period.

The "pressure-sensitive adhesiveness" of a substance may therefore be likewise assessed by a consideration of the variables of storage modulus (G') and loss modulus (G") ascertainable by means of dynamic mechanical analysis (DMA), as already introduced above, and more particularly by the absolute values of these variables. A substance and the layer produced from it are deemed in general to be pressure-sensitive adhesive, and are defined as such in the sense of this specification, if at room temperature, here by definition at 23° C., in the deformation frequency range from $10^0$ to $10^1$ rad/sec, G' is located at least partly in the range from $10^3$ to $10^7$ Pa and if G" is likewise at least partly within that range. "Partly" means that at least a section of the G' curve lies within the window subtended by the deformation frequency range of from $10^0$ (inclusive) to $10^1$ (inclusive) rad/sec (abscissa) and also by the range of G' values from $10^3$ (inclusive) to $10^7$ (inclusive) Pa (ordinate), and if at least a section of the G" curve is likewise situated within this window.

Within this region, which in a matrix plot of G' and G" (G' plotted as a function of G") may also be referred to as the viscoelastic window for PSA applications or as the PSA window according to viscoelastic criteria, there are in turn different sectors and quadrants which characterize more closely the PSA properties to be expected from the respectively associated substances. Within this window, substances with high G" and low G' are notable in general, for example, for high peel adhesion and low shear strength, whereas substances with high G" and high G' are distinguished both by high peel adhesion and by high shear strength.

Generally speaking, the knowledge about the relationships between rheology and pressure-sensitive adhesiveness is state of the art and is described for example in "Satas, Handbook of Pressure Sensitive Adhesive Technology, Third Edition, (1999), pages 153 to 203", the salient portions of which are hereby incorporated by reference within this disclosure.

Optionally, the thermally vulcanizable adhesive may also comprise tackifier resins, in order, for example, to generate or improve PSA properties. The term "tackifier resin" is understood by the skilled person to refer to a resin-based substance which increases the tack. Tackifier resins may be divided into natural resins and synthetic resins.

Typical natural resins are rosin-based resins and their derivatives. Rosins include, for example, natural rosin, polymerized rosin, partially hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin).

Typical synthetic resins are polyterpene resins, although the raw materials here originate from natural sources; hydrocarbon resins and terpene-phenolic resins. These are polymers of low molecular weight. The weight-averaged average molecular weight is generally less than 25 000 g/mol. Polyterpene resins are based on α-pinene and/or ß-pinene and/or δ-limonene. They may be hydrogenated, non-hydrogenated or partially hydrogenated.

Raw materials for the majority of hydrocarbon resins are by-products obtained in the cracking of naphtha or gas-oil. Hydrocarbon resins may be classified according to whether they are based primarily on aromatic, aliphatic or diene monomers. Aromatic resins are often referred to as C-9 resins, aliphatic resins as C-5 resins, and diene resins as $(C-5)_2$ resins. Mixed aromatic-aliphatic hydrocarbon resins ((C-5/C-9) resins) are likewise included by the concept of the invention. Hydrocarbon resins as well may be hydrogenated, non-hydrogenated or partially hydrogenated.

Further included in the concept of the invention are monomer resins of the styrene/α-methylstyrene type (CAS No.: 9011-11-4). Terpene-phenolic resins, according to DIN 16916-1 1981-06 and ISO/TR 8244:1988, are resins produced by acid-catalyzed addition reaction of phenols with terpenes or rosin.

Tackifier resins preferred in accordance with the invention are polyterpene resins based on α-pinene and/or ß-pinene and/or δ-limonene. Especially preferred are ß-pinene resins (CAS No.: 25719-60-2), an example being the resin Dercolyte S-115 from DRT.

Advantageous concentrations of the tackifier resins, if present, in the thermally vulcanizable adhesive are between 1.0 (inclusive) wt % and 30.0 (inclusive) wt %. Particularly advantageous are concentrations between 5.0 (inclusive) wt % and 20.0 (inclusive) wt %. The addition of tackifier resins has emerged as being advantageous particularly with regard to the adhesion properties of the thermally vulcanizable, preferably pressure-sensitive adhesive on oiled metal sheets prior to the thermal vulcanization reaction. In principle the prior-art tackifier resins known to the skilled person can be used. Examples of suitable tackifiers are the epoxy resins described in more detail later on—also in combination with other tackifiers.

As fillers, which may likewise be included optionally, it is possible to use not only reinforcing fillers, such as carbon black, for example, but also non-reinforcing fillers, such as carbonates, for example, especially chalk, or sulfates such as barium sulfate, for example. Other examples of fillers that are contemplated are silicates, such as talc, kaolin, calcined or partly calcined kaolin, wollastonites or micas, hydroxides or oxides, such as finely ground quartz, for instance, aluminum hydroxide, zinc oxide or calcium oxide. Microspheres are also contemplated as fillers. Microspheres may be solid glass microspheres, hollow glass microspheres and/or polymeric microspheres of all kinds. The polymeric microspheres may be in unexpanded or pre-expanded form. The particle size in the expanded state is usually in the range between 20 and 150 µm. Mixtures of the substances stated may also be used. In particular, mixtures of calcium carbonate and calcium oxide have proved to be particularly advantageous in respect of the attainment of high bond strengths and in respect of the minimization of occasional blistering during the thermal vulcanization. Advantageous weight fractions of calcium carbonate and calcium oxide in the thermally vulcanizable adhesive amount together to between 10.0 and 70.0 percent by weight. Talc and kaolin have proven advantageous for the same reasons and can be used preferably in the invention, in each case on their own or else in combination with one another. Advantageous weight fractions of talc and/or kaolin in total in the thermally vulcanizable adhesive amount to between 10.0 and 50.0 percent by weight.

The thermally vulcanizable, especially softenable, preferably pressure-sensitive adhesive may optionally further comprise bitumen. Bitumen is a dark-colored, high-molecular-mass hydrocarbon mixture which is semi-solid to springingly hard and which is obtained as a residue in the distillation of suitable petroleum, further containing chemically bonded sulfur, oxygen, nitrogen and some traces of metals. In physical terms, bitumen is among the thermoplastics, meaning that its properties are temperature-dependent. On cooling, it becomes brittle; on heating, it passes steplessly through all of the states from solid via highly viscous to highly mobile. Distinctions are made between, among others, the following bitumen varieties and derived products: roadbuilding bitumen, especially soft bitumen, modified bitumen, especially polymer-modified bitumen, industrial bitumen, especially oxidation bitumen or hard bitumen, flux bitumen, and bitumen emulsion.

Preferred in accordance with the invention is roadbuilding bitumen. Particularly preferred is the 50/70 grade, the numbers indicating the minimum and maximum penetration at 25° C. in the units of mm/10 in accordance with DIN EN 1426. Advantageous concentrations of bitumen in the thermally vulcanizable adhesive are between 1.0 (inclusive) wt % and 30.0 (inclusive) wt %. Particularly advantageous are concentrations of between 5.0 (inclusive) wt % and 20.0 (inclusive) wt %. The addition of bitumen allows an improvement in the oil absorption when bonding takes place to oiled metal sheets.

The thermally vulcanizable adhesive may optionally further comprise plasticizers. Plasticizers are liquid or solid, inert organic substances of low vapor pressure, primarily of ester-like type, which interact physically with high-polymer substances, without chemical reaction, preferably by virtue of their solvency and swelling capacity, but in some cases even without such behavior, and which are able to form a homogeneous system with said high-polymer substances. The abbreviated designations of plasticizers are regulated in DIN EN ISO 1043-3: 2000-01. The most important plasticizers can be divided into larger groups, which are listed below, with the abbreviated codes of DIN EN ISO 1043-3: 2000-01 being given in parentheses.

Phthalic esters, also called phthalates for short, include, among others, dioctyl phthalate (DOP; di(2-ethylhexyl) phthalate), diisononyl phthalate (DINP), diisodecyl phthalate (DIDP), phthalic esters with predominantly linear $C_6$ to $C_{11}$ alcohols, dibutyl phthalate (DBP), diisobutyl phthalate (DIBP), dicyclohexyl phthalate (DCHP), dimethyl phthalate (DMP) and diethyl phthalate (DEP), and also mixed esters, comprising benzyl (butyl) phthalate (BBP), butyl octyl phthalate, butyl decyl phthalate and dipentyl phthalate, bis(2-methoxyethyl) phthalate and dicapryl phthalate (DCP).

An example of trimellitic esters with (predominantly) linear $C_6$ to $C_{11}$ alcohols is tris(2-ethylhexyl) trimellitate (TOTM).

Acyclic aliphatic dicarboxylic esters are, for example, esters of adipic acid such as bis(2-ethylhexyl) adipate (dioctyl adipate, DOA), bis(8-methylnonyl) adipate (diisodecyl adipate, DIDA), dibutyl decanedioate (dibutyl sebacate, DBS), bis(2-ethylhexyl) decanedioate (dioctyl sebacate, DOS). An example of a cyclic aliphatic dicarboxylic ester is diisononyl 1,2-cyclohexanedicarboxylate (DINCH).

Examples of polymer plasticizers are polyesters of adipic, decanedioic, nonanedioic and phthalic acid with diols such as butane-1,3-diol, propane-1,2-diol, butane-1,4-diol, hexane-1,6-diol and others (Mn about 1800 to 13 000 g/mol).

Phosphoric esters, called phosphates for short, are a further group. Mention may be made here, by way of example, of tricresyl phosphate (TCF), triphenyl phosphate (TPP), diphenyl cresyl phosphate (DPCF), 2-ethylhexyl diphenyl phosphate (diphenyl octyl phosphate, DPOF), tris (2-ethylhexyl) phosphate (TOF) and tris(2-butoxyethyl) phosphate.

Butyl oleate or butyl stearate are examples of fatty acid esters, which represent a further group. Further examples of this group are methyl esters and butyl esters of acetylated ricinoleic fatty acid and fatty acid glycol esters and also triethylene glycol bis(2-ethyl butyrate).

Citric esters are examples of the group of hydroxycarboxylic esters. Further examples are tartaric esters and lactic esters.

A further group of plasticizers are epoxy plasticizers, as for example epoxidized fatty acid derivatives, especially triacyl glycerols and monoesters. Certain of the below-mentioned epoxy resins as well may be classed within the group of the plasticizers. Mention may further be made of polyamide plasticizers, as for example benzenesulfonamides or methylbenzenesulfonamides. Another group of plasticizers are alkylsulfonic esters of phenol (ASE). Mineral oils as well may be considered within the context of this specification to be plasticizers. Naphthenic mineral oils are preferred. The bitumen as well, already listed separately, could be classed under the heading of the plasticizers.

In one optional embodiment, the thermally vulcanizable adhesive comprises further auxiliaries and adjuvants such as, for example, rheological additives, aging inhibitors (antioxidants), light stabilizers or UV absorbers. Examples of rheological additives are pyrogenic, hydrophobized or non-hydrophobized silicas, phyllosilicates (bentonites), high molecular mass polyamide powders or castor oil derivative powders. The stated rheological additives may also be classed under the heading of fillers. The suitable antioxidants include, for example, sterically hindered phenols, hydroquinone derivatives, amines, organic sulfur compounds or organic phosphorus compounds. Light stabilizers employed are, for example, the compounds disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148 and in Ullmann ($4^{th}$) 8, 21; 15, 529, 676.

In addition to the one or more vulcanizing systems, the thermally activatable adhesive may also comprise reactive compounds, especially oligomeric and/or polymeric in form, which can be cured by other curing mechanisms. Hence, for example, there may be reactive resins present which are able to react either with parts of the vulcanization accelerators or other aforementioned additives, or else with further added curing agents. Reactive resins may serve in particular to crosslink the layer of adhesive and so to raise the cohesion. Reference here may be made to the state of the art, which is known to the skilled person.

The thermally vulcanizable adhesive may optionally comprise, for example, epoxy resins. The term "epoxy resin" here refers to synthetic resins which carry epoxide groups. Advantageous are bisphenol-based epoxy resins, especially those based on bisphenol A, but also those based on bisphenol F. Particularly advantageous is an epoxy resin which is liquid at room temperature, especially the reaction product of bisphenol A and epichlorohydrin that has a number-averaged, average molecular weight of less than or equal to 700 g/mol (CAS No. 25068-38-6), but also corresponding solid reaction products having higher number-averaged average molecular weights are optional epoxy resins. Other advantageous epoxy resins are epoxyphenol-novolac resins, epoxydicyclopentadiene-phenol-novolac resins, epoxycresol-novolac resins, glycidylamine-based epoxy resins, especially triglycidyl ethers of para-aminophenol, triglycidyl ethers of meta-aminophenol, tetraglycidyl ethers of methylenedianiline, hydroxyphenyl-based epoxy resins, and aliphatic epoxy resins, especially those which are cycloaliphatic. Particularly noteworthy here is 3,4-epoxycyclohexylmethyl 3',4'-epoxycyclohexanecarboxylate (CAS No. 2386-87-0).

An advantageous concentration of the epoxy resin in the thermally vulcanizable adhesive is between 1.0 wt % (inclusive) and 30 wt % (inclusive). Particularly advantageous is a concentration between 5 wt % (inclusive) and 20 wt % (inclusive). The addition of epoxy resins has emerged as being advantageous particularly in respect of the adhesion properties of the thermally vulcanizable adhesive on metal sheets, including painted metal surfaces (for example, CEC-coated surfaces) after the thermal vulcanization reaction. Moreover, the viscosity of the compound during the production of the adhesive is lowered advantageously, allowing operation to take place at lower process temperatures.

The adhesive is produced preferably by the customary methods known to the skilled person, especially preferably in a solvent-free, continuous compounding and coating operation. For compounding in an extruder it is advantageous for the compounding extruder used to be a planetary roller extruder, since this allows the compounding temperatures to be held at low temperatures. The layer may be shaped, for example, by shaping of the adhesive, which has a temperature of around 40° C. to 100° C., to a film directly by means of a downstream roll applicator, for instance between two incoming temporary carriers with antiadhesive surface, through siliconization, for example. An alternative mode of producing the layer is by nozzle application.

In one very special version of the method of the invention (referred to below as "special version") the thermally vulcanizable adhesive used is a—preferably pressure-sensitive—adhesive comprising a—preferably meltable-polybutadiene-polyurethane, a sulfur-containing vulcanizing agent—preferably ground sulfur—and optionally one or more substances selected independently of one another from the list consisting of vulcanization accelerators, fillers, epoxy resins, tackifier resins, bitumen, plasticizers. Further auxiliaries and adjuvants may optionally be present. The adhesive of the special version, very advantageously, is softenable in the manner already defined generally above for the thermally vulcanized adhesive.

Ground sulfur is soluble or insoluble ground elemental sulfur. The purity level ought to be at least 95%, more preferably at least 99%. The degree of grind of the sulfur ought to be such that the sieve residue at a mesh size of 100 μm is at most 2%. Coarser grades, while also working in principle, may nevertheless result in an adhesive which possesses a roughness that is clearly perceptible optically, and the achievable bond strengths are somewhat lower.

Of the optional classes of substance of vulcanization accelerator, filler, epoxy resin, tackifier resin, bitumen, plasticizer and also further auxiliaries and adjuvants, it is possible for there to be in each case only one or any desired combination of two or more classes of substance. Similarly, within a class of substance, there may in each case be one compound or any desired number of different compounds. These and/or further additives are selected with particular advantage as described above in each case.

The thermally vulcanizable adhesive of the special version preferably has, at room temperature, a solid or at least very high-viscosity consistency, and is preferably pressure-sensitive adhesive. The thermally vulcanizable adhesive may advantageously be processed in a temperature range between approximately 40° C. and 100° C. as a melt in a compounding and extrusion operation, and is vulcanizable and hence curable thermally in a temperature range between 120° C. and 230° C. The curing thus achieved constitutes chemical crosslinking. For this special version, the thermal vulcanization is a sulfur vulcanization—that is, the crosslinking of unsaturated compounds by means of sulfur that is activated and completed by temperature increase. To activate the sulfur vulcanization it is possible to add vulcanization accelerators and vulcanizing auxiliaries and adjuvants. These agents effect a lowering of the activation temperature and/or an accelerated curing and crosslinking. For the special version as well, reference is made explicitly to the statements given above concerning these compounds in relation to the thermally vulcanizable adhesive. The thermally vulcanizable, preferably pressure-sensitive adhesive of the special version may optionally comprise one or more epoxy resins. For the special embodiment as well, reference is made explicitly to the observations given above in relation to epoxy resins employable, and their concentrations, in the thermally vulcanizable adhesive.

The chemical reaction to form the—preferably meltable—polybutadiene-polyurethane advantageously takes place already in the presence of the optional at least one epoxy resin. The advantage of this method is that the at least one epoxy resin can be incorporated at room temperature, saving energy. If, in contrast, the polybutadiene-polyurethane was first prepared and subsequently the at least one epoxy resin was added, it would be necessary first to heat the polybutadiene-polyurethane so that it formed a melt. The disadvantage of this would be the need for a higher energy input. Another advantage is that the softening/melting temperature of the mixture of prepolymer and epoxy resin is much lower than the softening/melting temperature of the pure prepolymer, while retaining the hotmelt character. Later compounding with sulfur and other substances, such as vulcanization accelerators, for example, can therefore be undertaken gently and in an energy-saving way at lower temperatures than without the epoxy resin already incorporated during preparation of the polybutadiene-polyurethane. In this way, compounding with so-called ultra accelerators, which in some cases triggers the vulcanization within a few minutes even at approximately 120° C., is also possible, without unwanted instances of curing or gelling during the compounding operation. Where the subsequent compounding of the polybutadiene-polyurethane takes place with sulfur, vulcanization accelerators and vulcanizing auxiliaries and adjuvants in a continuously operating mixing assembly, especially in a compounding extruder, a further advantage is provided by the fact that none of the metering points on the compounding extruder, whose availability is generally limited, would be blocked by the at least one epoxy resin. Compounding extruders which can be used with particular preference include annular extruders or planetary roller extruders. With these it is possible to compound thermally curable adhesives at sufficiently low temperatures.

The fact that it is technically possible to bring about the isocyanate-based chemical reaction to form the polybutadiene-polyurethane in the presence of one or more epoxy resins is surprising to the skilled person, since isocyanates are described in the technical literature as reactive toward epoxides, as for example in Ullmann's Encyclopedia of Industrial Chemistry, 6th Edition, Vol. 12, page 271 (Table) and in Encyclopedia of Polymer Science and Engineering, Vol. 6, p. 345.

Surprisingly it has been found, moreover, that mixtures of epoxy resin and the polybutadiene-polyurethane hotmelt tend toward a phase separation if the at least one epoxy resin is admixed only after the preparation of the polybutadiene-polyurethane. If, in contrast, the chemical reaction to give the polybutadiene-polyurethane takes place in the presence of the epoxy resin/resins, then indeed in general the resulting mixtures, depending on mixing ratio, are turbid, but they do not separate, and they have the advantage of vulcanizing (curing) homogeneously, so enabling a higher strength and a better adhesion to be achieved than when using an inhomogeneous mixture of polybutadiene-polyurethane and epoxy resin. In a similar way, other substances, such as, for example, plasticizers, tackifier resins, bitumen or else fillers or rheological additives, can be added as early as before or during the chemical reaction to give the polybutadiene-polyurethane.

In an advantageous refinement of the special version, the polybutadiene-polyurethane is a reaction product prepared by a polyaddition reaction of at least one polybutadiene-diol, at least one chain extender having a hydroxyl functionality of two and a molar mass of less than or equal to 300 g/mol, and optionally at least one polybutadiene-polyol having a number-averaged average functionality of between greater than 2.0 and less than or equal to 3.0, with at least one aliphatic or alicyclic diisocyanate.

Chain extenders in the sense of this specification are all hydroxyl-bearing compounds having a hydroxyl functionality of two and a molar mass of less than or equal to 300 g/mol. They carry no further isocyanate-reactive groups. They are therefore diols having a molar mass of less than or equal to 300 g/mol. It is known that many chain extenders used in the preparation of polyurethanes based on polyester-polyols or polyether-polyols are not compatible with polybutadiene-diols and -polyols. Separation occurs. Inventively preferred are the chain extenders that are compatible with polybutadiene-diols and -polyols. These are, for example, N,N-diisopropanolaniline (CAS No. 003077-13-2), 2,2,4-trimethyl-1,3-pentanediol (CAS No. 144-19-4) and 2-butyl-2-ethyl-1,3-propanediol (CAS No. 115-84-4). Particularly preferred is 2-ethyl-1,3-hexanediol (CAS No. 94-96-2). The knowledge about the chain extenders that are compatible with polybutadiene-diols and -polyols is part of the state of the art. It is published for example in Herbert Chao, Nan Tian, Cray Valley, USA, LLC, Exton, PA, PCI, April 2010.

In order to achieve high pressure-sensitive adhesiveness (high tack) while at the same time avoiding excessive softness in the polybutadiene-polyurethane, which would lead to reduced shear strength, it is advantageous if the numerical proportion of the hydroxyl groups introduced for forming the polybutadiene-polyurethane that originate from the at least one chain extender is between greater than or equal to 20.0% and less than or equal to 80.0%, preferably between greater than or equal to 30.0% and less than or equal to 70.0%. The numerical fraction always corresponds to the amount-of-substance fraction.

A polybutadiene-diol in this specification refers to all hydroxyl-functionalized polybutadienes or derivatives thereof whose number-averaged average hydroxyl functionality is two or somewhat less than two, but at least 1.5, preferably at least 1.8. The number-averaged average hydroxyl functionality of a polybutadiene-diol is in no case greater than two.

A polybutadiene-polyol for the purposes of this specification refers to all hydroxyl-functionalized polybutadienes or derivatives thereof having a number-averaged average functionality of between greater than 2.0 and less than or equal to 3.0.

The number-averaged average hydroxyl functionality is understood to be the average number of hydroxyl groups per molecule of a polyol. In this specification it is expressed relative to the number-averaged average molecular weight of the polyol in question, and is calculated according to the following formula in Equation (1):

$$f = M_n [g/mol] \times OHN [mmol\ OH/kg]/10^6 \quad (1)$$

where f is the number-averaged average hydroxyl functionality, $M_n$ is the number-averaged average molecular weight of the respective polyol in the units [g/mol] and OHN is the hydroxyl number of the polyol in the units [mmol OH/kg].

The hydroxyl number in Equation (1) is a measure of the amount of hydroxyl groups in a polyol. The hydroxyl number is determined here according to DIN 53240. According to this method, the hydroxyl number (OHN) is expressed in the units [mg KOH/g]. It corresponds to the amount of KOH in [mg] which is equivalent to the amount of acetic acid bound in the acetylation of 1 g of polyol. For simplification of the formula calculations, the hydroxyl number in this specification is converted to the units [mmol OH/kg] according to the following formula in Equation (2):

$$OHN\ [mmol\ OH/kg] = OHN\ [mg\ KOH/g] \times 1000/56.1 \quad (2)$$

where 56.1 here is the molar mass of KOH.

The bonding of the hydroxyl groups of the polybutadiene-diols and -polyols to the polybutadiene chain may be primary or secondary. The butadiene units of the polybutadiene chain may be linked with one another in a 1,4 cis or trans form or in a 1,2 form with vinyl groups in the side chain, or in a mixed way. Polybutadiene-diols are prepared by anionic polymerization, whereas polybutadiene-polyols having a number-averaged average functionality of between greater than 2.0 and less than or equal to 3.0 are prepared by radical polymerization. Polybutadiene-diols are available commercially under the tradename Krasol®; polybutadiene-polyols having a number-averaged average functionality of between greater than 2.0 and less than or equal to 3.0 are available commercially under the tradename Poly bd®, both products from the company Cray Valley.

To achieve a high pressure-sensitive adhesiveness (high tack) it is advantageous to use polybutadiene-diols having a number-averaged average molar mass of between greater than 1000 g/mol and less than 5000 g/mol, preferably between greater than or equal to 2000 g/mol and less than or equal to 3000 g/mol.

For the same reason, the optional polybutadiene-polyols having a number-averaged average functionality of between greater than 2.0 and less than or equal to 3.0 ought advantageously also to have a number-averaged average molar mass of between greater than 1000 g/mol and less than 5000 g/mol, preferably between greater than or equal to 2000 g/mol and less than or equal to 3000 g/mol.

The polybutadiene-polyols having a number-averaged average functionality of between greater than 2.0 and less than or equal to 3.0 may be used optionally for producing the polybutadiene-polyurethane, in order to incorporate branching sites into the polyurethane. A certain degree of branching would have the advantage of reduced softening on the part of the coated polyurethane during thermal vulcanization, in the course of the supplying of temperature but before the onset of the vulcanization reaction, and hence of a greater shear strength in this phase immediately prior to the curing brought about by the vulcanization.

If also using the optional polybutadiene-polyols having a number-averaged average functionality of between greater than 2.0 and less than or equal to 3.0 for producing the polybutadiene-polyurethane, it is necessary to ensure that no gelling occurs, in other words that the degree of branching in relation to the length of the prepolymer chains produced is not so high that there is crosslinking during the polyaddition reaction. A degree of branching is set in particular such as to ensure the meltability of the polybutadiene-polyurethane, in other words such that no crosslinked structures are formed. In order to rule out crosslinked structures, it is mandatory not to exceed what is called the gel point. The theoretical gel point can be calculated using the gel point equation of P. J. Flory. A formula derived from the Flory equation and used for estimating the gelling NCO/OH ratio in reactions of polyurethane formation from diols and triols with diisocyanates in deficit reads as follows in Equation (3):

$$\left(\frac{NCO}{OH}\right)_{gelling} = \cfrac{1}{1+\cfrac{1}{\cfrac{(diol-OH)}{(triol-OH)}+1}} \quad (3)$$

The diol-OH in this formula given by Equation (3) refers to the total number of hydroxyl groups involved in the polyurethane formation reaction and originating from polyols whose hydroxyl functionality is less than or equal to two. This also includes the chain extenders. The triol-OH refers to the total number of hydroxyl groups involved in the polyurethane formation reaction and bonded to polyols whose functionality is greater than two and less than or equal to three. If the gelling NCO/OH ratio is reached or exceeded, there is a likelihood that crosslinked structures will form, and therefore that gelling will ensue. The formula provides only an approximate starting point, but nevertheless one which is generally sufficient for practical purposes, for determining the NCO/OH ratio at which gelling actually occurs. If operating with diisocyanates in excess, in other words if the NCO/OH ratio is greater than 1.0, the above formula should be applied reciprocally.

The numerical fraction of the hydroxyl groups introduced for forming the polybutadiene-polyurethane and originating from the optional at least one polybutadiene-polyol having a number-averaged average functionality of between greater than 2.0 and less than or equal to 3.0 is advantageously not more than 50.0%, preferably not more than 30.0%, more preferably not more than 10%. Higher fractions require a disadvantageously low NCO/OH ratio in the case of NCO deficit, or a disadvantageously high NCO/OH ratio in the case of NCO excess, which would result in a disadvantageously low softening temperature of the hydroxyl-functionalized polybutadiene-polyurethane hotmelt prepolymer. With regard to operational reliability, the fraction is especially advantageously 0.0%. At a fraction of 0.0%, the risk of premature formation of crosslinked structures, in other words the onset of gelling during polyurethane production, is the lowest.

The polybutadiene-polyurethane is obtained by reaction of the stated diols/polyols with at least one aliphatic or alicyclic diisocyanate. Aliphatic or alicyclic diisocyanates are understood in this specification to be all organic polyisocyanates having an isocyanate functionality of two in which the isocyanate groups are not bonded directly to a ring system which is aromatic in accordance with Hückel's rule. Examples of aliphatic or alicyclic diisocyanates are butane 1,4-diisocyanate, tetramethoxybutane 1,4-diisocyanate, hexane 1,6-diisocyanate, ethylene diisocyanate, 2,2,4-trimethylhexamethylene diisocyanate, ethylethylene diisocyanate, dicyclohexylmethane 4,4'-diisocyanate (H12MDI), 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)-cyclohexane, 2-heptyl-3,4-bis(9-isocyanatononyl)-1-pentylcyclohexane, norbornane diisocyanatomethyl and also m-tetramethylxylene diisocyanate (TMXDI). Particularly preferred are isophorone diisocyanate (CAS No. 4098-71-9) and dicyclohexylmethane 4,4'-diisocyanate (CAS No. 5124-30-1).

In one advantageous embodiment, the ratio of the total number of isocyanate groups to the total number of hydroxyl groups in the substances involved in the chemical reaction to give the polybutadiene-polyurethane is between greater than or equal to 0.3 and less than or equal to 1.3, preferably between greater than or equal to 0.4 and less than or equal to 1.2, more preferably between greater than or equal to 0.5 and less than or equal to 1.1, especially preferably between greater than or equal to 0.6 and less than or equal to 1.0. The preferred ratios result in hotmelt polyurethanes having a particularly firm consistency at room temperature and at the same time a high pressure-sensitive adhesiveness (high tack).

The polybutadiene-polyurethane preferably comprises the chemical reaction product of exclusively one or more polybutadiene-diols, optionally one or more polybutadiene-polyols having a number-averaged average functionality of between greater than 2.0 and less than or equal to 3.0, and one or more chain extenders having a hydroxyl functionality of two and a molar mass of less than or equal to 300 g/mol with one or more aliphatic or alicyclic diisocyanates. Preferably, therefore, there are no additional, other polyols or isocyanates involved in the chemical reaction to give the polybutadiene-polyurethane, and more particularly no polyether-polyols, no polyester-polyols and no aromatic diisocyanates. It is assumed that when the polybutadiene-polyurethane of the invention is used as a base elastomer in the production of a thermally vulcanizable, preferably pressure-sensitive adhesive, polyether-polyols and polyester-polyols have disadvantageous consequences for the adhesion properties after the vulcanization reaction, especially for the adhesion properties on oiled metal sheets. It is further assumed that aromatic diisocyanates are disadvantageous for the pressure-sensitive adhesiveness (the tack).

To accelerate the reaction, the chemical conversion to form the polybutadiene-polyurethane takes place preferably with addition of a catalyst. It is possible to use one or more catalysts known to the skilled person, such as, for example, tertiary amines, organobismuth or organotin compounds, to name but a few. Very advantageously it is possible to use catalysts containing bismuth and carbon, preferably a bismuth carboxylate or a bismuth carboxylate derivative. Particularly advantageous is bismuth trisneodecanoate (CAS No. 34364-26-6). The concentration of the catalysts is tailored to the desired reaction rate and is situated typically at between 0.01 wt % and 0.5 wt % of the polybutadiene-polyurethane to be prepared.

The polybutadiene-polyurethane of the invention is preferably prepared without the use of solvents. Including solvents in the production operation, while readily possible technically, does not normally bring any advantages. The polybutadiene-polyurethane is advantageously produced batchwise, in other words discontinuously, for example in a heatable mixing vessel, kneading apparatus, planetary mixer or dissolver. In order to achieve absence of bubbles, mixing takes place in the end phase of the operation, when the chemical reaction is largely concluded, preferably under reduced pressure.

The method of the invention uses an at least two-layer adhesive product which as well as the thermally activatable adhesive layer, which advantageously is configured as set out above, comprises at least one film layer of a polymeric material. As used herein, the term "film layer" refers to a sheetlike constituent of the adhesive product, without further restrictions on its specific appearance or the material. With regard to "films", as used herein, the thickness is generally very much smaller than the extent in the two spatial directions perpendicular to the thickness. The film layer consists in the invention of a polymeric material which is composed in particular of one or more polymers—referred to below as film polymer component—and optionally of admixtures—referred to below as film additive component. The film polymer component may consist of a homopolymer or of a copolymer or of a mixture of one or more homopolymers and/or one or more copolymers. The film polymer component may be the sole constituent of the film layer, or else it may optionally also have been admixed, as film additive component, with one or more adjuvants, fillers, additives or the like.

One of the functions of the film layer is to protect the ultimate sealing site from external influences—such as mechanical effects, chemicals, moisture and environmental influences. A further function is to give the sealing site a visually attractive appearance. For this purpose, after the sealing operation and the cooling, the film layer is to cover the adhesive layer as completely as possible and to have a largely smooth, drop-free and crease-free surface. The material of the film layer is advantageously selected such that, after the sealing operation and the cooling, distortions and discontinuities arising from stresses within the film layer are avoided as far as possible. It is therefore advantageous to use, for the film layer, a material which has a sufficient degree of softening—even, where appropriate, melting, but without becoming so highly fluid (of such low viscosity) that, for instance, dripping might occur or the melted polymeric material might run off entirely from the adhesive layer, and so the softened film layer conforms well to the adhesive layer and covers it as far as possible without blisters or creases. It is useful if the film layer is capable of evening out any irregularities in the surface of the adhesive layer, at the point of transition from adhesive layer to substrate, especially bodywork panel, or at other locations where these occur in the region of the sealing site.

The material of the film layer ought, therefore, preferably to be selected such that the film layer exhibits high compatibility, especially adhesion after full cooling, to the adhesive layer and advantageously to the substrate as well—such as, for instance, unpainted or painted metal, oily metal or the like. At least in the fully cooled state, the film layer ought itself to be readily coatable, in other words, in particular, to present a good base for the automotive finishes with which the bodywork itself is or will be painted. In an alternative, albeit not always preferred, procedure, it may be sufficient for the film layer to present a good base not for the automotive finishes themselves, but at least for those paints and applications of color which in optical terms, after coating, act essentially like the automotive finishes themselves.

The film layer is made of a polymeric material which comprises the film polymer component and optionally a further film additive component. It is desirable for a polymeric material used as film layer to be a material which is dimensionally stable at room temperature but which, at the temperature of use, softens at least to such an extent that it masks the adhesive on the irregularity without air and without blisters and at the same time has an outwardly visually attractive appearance, being, in particular, free from blisters and creases and representing a smooth, closed surface. Ideally the softened film layer conforms optimally to the adhesive on the irregularity and in turn seals the bordering edges thereof on the substrate. Minor unevennesses formed by the adhesive on the substrate can be compensated advantageously by the softened film layer, especially preferably without the surface of the film layer itself suffering any substantial reduction in visual flawlessness. After the softened film layer has cooled on the sealing site, it regains its dimensional stability, and so the visually attractive masking of the seal is obtained permanently. The cooled film layer can then be provided in particular with further layers, such as with a coating layer, especially a coating layer corresponding to the vehicle finish.

For the dimensional stability of the film layer at room temperature it is an advantage if the polymeric material of the film layer, especially in a ready-made blend with any adjuvants present, has a glass transition temperature of not more than −15° C., preferably not more than −20° C. Glass transition points—referred to synonymously as glass transition temperatures—are reported as the result of measurements made by dynamic scanning calorimetry (DSC) in accordance with DIN 53765:1994-03; especially sections 7.1 and 8.1, but with uniform heating and cooling rates of 10 K/min in all heating and cooling steps (compare DIN 53765:1994-03; section 7.1; note 1). The sample mass is 20 mg. The figures for the glass transition temperature $T_g$ relate to the glass transformation temperature $T_g$ according to DIN 53765:1994-03 of the second heating curve, unless otherwise specified in a particular case. The choice of a film material having the specified glass transition values ensures the flexibility of the film even at low temperatures, as desirable in particular for applications in the automobile segment.

In accordance with the invention it has emerged as being very advantageous if the film layer is selected such that it is softenable in a defined way on use. The characterization of the softenability is performed in accordance with the same principle as already set out above for the adhesive. In this case, the softening point of the polymeric material of which the film is made is designated $T_{Erw,F}$. The invention advantageously selects those films which are softenable in so far as on stepwise temperature increase and on the basis of the softening process (that is, on transition from the rubber-elastic range into the fluid range) at a deformation frequency of 10 rad/s, the loss modulus G" and the shear modulus G', below the highest process temperature $T_{P,max}$ adopt the same value, especially at not more than 200° C., more preferably at not more than 150° C., so that $T_{Erw,K} \leq T_{P,max}$, preferably $T_{Erw,K} \leq 200°$ C., more preferably $T_{Erw,K} \leq 150°$ C. With further preference the films are selected such that the temperature value $T_{Erw,F}$ at which the loss modulus G" and the shear modulus G' adopt the same value under the measuring conditions stated above is not lower than 70° C. so that it is preferably the case for $T_{Erw,F}$, at which tan δ=G"/G'=1 on transition from the rubber-elastic range into the fluid range, that advantageously $T_{Erw,F} \geq 70°$ C.

The specified values refer again to measurement by dynamic mechanical analysis (DMA); plate/plate arrangement, sinusoidally oscillating shear stress (deformation frequency) 10 rad/s, step width of the measurement values 2.5° C., see DIN EN ISO 6721-1. The start and end temperatures of the measurement are selected here such that the softening range is within the chosen temperature window (for example from −60° C. to +180° C.). By way of example, films which have emerged as being very suitable are those whose softening points are in the range from 80° C. to 95° C. or in the range from 120° C. to 140° C.

The choice of film materials having suitable softening points ensures that during the typical coating operations in automobile construction, the film material flows well while nevertheless not liquefying to an excessive extent, so that it does not run out of the sealing site. As and when necessary, the viscosity of the softened film material can be adjusted by the admixing of rheological modifiers. This can prevent the development of "runs" in the sealing operation (projections of material on the film surface after cooling, owing to flow of the film material in drop form). Especially when using film materials having low softening points (as in the case, for example, of films having a softening point between 80° C. and 95° C.), the melt viscosity can be adjusted hereby to a sufficient value in order to prevent such defects or other defects caused by excessive flow of the film material in the process.

As a result of the choice of films made from a material which is largely dimensionally stable at room temperature but which is softenable as described above, the result is a surface appearance of the sealing sites that is significantly more attractive than when using nonsoftenable or brittle films. This could not have been expected in the invention, since the prior art specifically proposes the use of nonsoftenable or nonflowable films in order to optimize the appearance of the sealing site. In that prior art it is argued that only films which remain dimensionally stable on heating would preserve their smooth structure in the context of sealing. In accordance with the invention, however, the films defined as advantageous above lead to better results.

The polymeric material for the film layer is advantageously selected such that it has a melt viscosity (dynamic viscosity), calculated from the measurement according to DIN EN ISO 1133-1 at 160° C. (2.16 kg), of 50-350 Pa·s, preferably of 150 to 300 Pa·s. The polymeric material for the film layer is further advantageously selected such that it has a melt flow rate (MFR) according to DIN ISO 1133-1 at 160° C./2.16 kg of 20-150 g/10 min (160° C., 2.16 kg), preferably of 35-120 g/10 min (160° C., 2.16 kg).

The film used advantageously has an elongation at break (determined to ISO 527-3 in conjunction with ISO 527-1 No. 3.7.2, 50 mm/min, 23° C.) of 150% or more. The film materials used advantageously have a low tendency to water absorption. The films preferably are selected such that the water absorption to DIN EN ISO 62 is less than 5 wt %, preferably less than 3 wt %. The film used in the invention advantageously has a behavior in the cross-cut test according to ASTM D3359 such that not more than 15% of the area, preferably not more than 5%, has undergone parting. More advantageously these values are also maintained after storage for 240 h at 40° C. and 100% relative humidity. Advantageously the behavior of the films used in the invention is such that after storage for 240 h at 40° C. and 100% relative humidity and on evaluation to ISO 4628-2 (blistering) there is no discernible blistering ("constant humidity storage").

The polymeric material of the film layer is preferably amorphous or semicrystalline. For example, the solely used polymer of the film polymer component is itself already amorphous or semicrystalline. Where two or more polymers are used as film polymer component, it is possible for example for all or the predominant part of the polymers to be amorphous and/or semicrystalline. Such polymers preferably produce the films having the desired softening properties as defined above. Polymeric materials with higher degrees of crystallization, through to fully crystalline systems, generally have properties which are too brittle to satisfy on their own the requirements placed in accordance with the invention and to be used in the invention. If such materials are nevertheless to be used in the invention, it is generally necessary to admix plasticizing co-components, such as correspondingly suitable other polymers and/or resins, plasticizers, etc., in or to the film polymer component. In an onward development of the invention, accordingly, the polymeric material comprises admixed polymeric co-components and/or plasticizing additives of this kind, such as correspondingly suitable resins, plasticizers or the like, advantageously in amounts ensuring that even in those cases where polymers are present that as homopolymers are not amorphous or at least semicrystalline, they do not disrupt the amorphous or semicrystalline nature of the polymeric material as a whole.

In a preferred procedure, the polymeric material of the film layer comprises one or more thermoplastics, or the film polymer component consists exclusively of one or more thermoplastics. The suitable thermoplastic or, where there are a plurality of thermoplastics present, the thermoplastics independently of one another may be selected with particular advantage from the following list: polyesters, polyamides, copolyamides, polyurethanes, ionomers, thermoplastic elastomers, polyvinyl acetates, polyvinyl chlorides, polyvinyl butyrals, ethyl acrylates or, preferably, copolyesters. In one particularly advantageous procedure the film polymer component is formed by a polyester or copolyester or by a mixture of (co)polyesters; this film polymer component is optionally admixed with additives, especially as detailed below.

In the case of the adhesive product used in the invention, the film layer of the polymeric material (referred to below simply as "film layer") may in turn be pressure-sensitive adhesive or not at room temperature. In one preferred version of the invention, the film layer itself is not pressure-sensitive adhesive at room temperature, and more particularly it has no self-adhesive properties in a temperature range up to 45° C., so facilitating the handling of the adhesive product. The film layer which either is or is not pressure-sensitive adhesive may be formed, for example, by a hotmelt adhesive, or comprises a hotmelt adhesive. Hotmelt adhesives are kinds of physically setting adhesive. At room temperature they are typically present as one component in a solid and largely solvent-free form, have thermoplastic properties, and for use as adhesives are brought into the melt state. On cooling, they set physically with solidification. Suitable raw materials for hotmelt adhesives include ethylene-vinyl acetate copolymers, ethene-ethyl acrylate copolymers, polyamides, thermoplastic elastomers, polyesters, copolyesters, polyisobutene or polyvinyl butyrals. Frequently these raw materials are used together with additives, such as natural or synthetic resins, especially reactive resins and/or tackifier resins, or paraffins, waxes, plasticizers, oils, stabilizers, fillers and/or other additives influencing the properties of the adhesive per se and/or the properties of the adhesive layer. Hotmelt adhesives may also have a reactive construction, where at least some of the raw materials and/or additives of the adhesive are able, especially under initiation by heat, to enter into chemical reaction, so that as well as the physical setting process there is chemical curing of the adhesive.

The polymeric material of the film layer may optionally comprise additizations. In accordance with the invention it is possible, for example, to admix one or more additives from the following list:

colorants: for example, titanium dioxide, carbon black, inorganic chromatic pigments, organic chromatic pigments, dyes.
lubricants: for example, fatty acid esters, fatty alcohols, waxes, metal soaps, fatty acid amides, montan waxes, polyethylene waxes, polypropylene waxes.
antiblocking agents: for example, polydimethylsiloxane, chalk, talc, crosslinked silicone resins.
antistats: for example, fatty acid esters, fatty acid amides, ethoxylated amines, diethanolamides, ethoxylated alcohols, alkylsulfonates, alkyl phosphates, carbon black, glycerol monostearate.
antioxidants: for example, sterically hindered phenols, aromatic amines, sterically hindered amines, organic phosphites, phosphonites, thioesters, substituted phenols, bisphenols, dihydroquinolines, diphenylamines, benzimidazoles.
UV stabilizers: for example, substituted benzophenones, salicylic esters, hydroxyphenylbenzotriazoles, triazines, benzylidene-malonates, carbon black, sterically hindered amines, nickel chelates, metal complexes of sulfur-containing compounds.
rheology modifiers: for example, phyllosilicates, fumed silica, polymeric thixotropic agent, polyalkylene ethers, glycerol monostearates, octyl epoxysoyates, polyhydroxyalkanoates, glycols, dioctylsulfosuccinate, alkanesulfonates, sulfonated fatty acids, phthalates, trimellitates, polyethylene glycols, phosphates.
fillers: for example, carbon black, calcium carbonate, talc, silica, kaolin, aluminum trihydrate, mica, wollastonite, microbeads, phyllosilicates, carbon particles, nanotubes, fibers.
crosslinkers, for example, peroxides, epoxides, amines, silanes.

The representatives identified specifically for each of the additives can be used advantageously in the invention, but are given only by way of example, and so there is no intention that the respective group of additives for the purposes of the inventive teaching be confined to the compounds specifically stated.

Film layers which can be used in the invention are obtainable, for example, by extrusion and subsequent layering of the polymeric material—produced for instance in a flat film process. The film web obtained by the extrusion runs flat in the production plane. As the shaping tool for layering it is possible to use dies, such as slot dies, for example. The typical procedure in flat film extrusion is as described hereinafter. First of all, the respective polymeric material (referred to below as polymer) used for film production is melted in the extruder (examples being single-shaft or multi-shaft extruders; single-screw extruder, twin-screw extruder, multiscrew extruder, planetary roller extruder, annular extruder). The melt emerges—optionally via a screen pack acting as filter—from a slot die as shaping tool. Subsequent cooling is on a chill roll. The film web is placed onto the surface of the chill roll by means of airbrush/blade/knife or electrostatic charging. Downstream of the chill roll, the film web is monitored for uniform thickness and is guided over further rolls for winding. Typical thickness tolerances in the flat film process are between 5% and 10%. Before the final winding, further process steps may take place (such as, for example, edge trimming, printing, drawing, embossing, surface treatments, etc.).

For the admixing of additives (e.g., color pigments, UV stabilizers, etc.) it is possible to utilize master batch systems. These master batch pellets comprise the corresponding additives in high concentration in a polymer matrix, and can be blended with the polymer pellets to be processed, in the desired concentration, prior to addition into the extruder. The process conditions (e.g., temperatures in the extruder, temperature of the chill roll, etc.) are adapted to the particular polymer being processed and to the requirements relating to the film. In the flat film process it is also possible in principle for different polymer layers to be laid atop one another before exit from the die gap, with the aid of a suitable tool (coextrusion using a plurality of extruders), so as to produce a multi-ply film construction.

The adhesive product used in the invention is of at least two-layer construction and comprises at least the thermally activatable adhesive layer and also the polymeric film layer. The thickness of the thermally activatable adhesive layer is advantageously from 70 to 2000 µm, preferably from 90 to 1000 µm, very preferably from 100 to 500 µm. The thickness of the film layer of the polymeric material is advantageously from 10 to 1000 µm, preferably from 50 to 700 µm, very preferably from 90 to 500 µm.

In one preferred variant embodiment of the method of the invention, the adhesive product used is of precisely two-layer construction, hence comprising exclusively the thermally activatable adhesive layer and also the film layer of the polymeric material, these layers possibly being formed, with particular advantage, according to the above-stated specifications. Optionally, in order to improve the cohesion of the two layers to one another, the surface of the adhesive layer facing the film layer, or the surface of the film layer facing the adhesive layer, or else both aforesaid layers, may have undergone physical and/or chemical pretreatment; here it is possible in principle to employ procedures known to the skilled person from the prior art, such as plasma treatment and/or corona treatment and/or priming, for example.

In an alternative procedure, the adhesive product may be formed of three or even more layers. Accordingly, between the thermally activatable adhesive layer and also the film layer of the polymeric material, there may, for example, be an adhesion-promoting layer, which improves the adhesion between the adhesive layer and the film layer. Here as well, of course, the surface of the adhesive layer facing the film layer, or the surface of the film layer facing the adhesive layer, or else both aforesaid layers, may have undergone physical and/or chemical pretreatment, and/or one or both surfaces of the adhesion-promoting layer.

With multilayer products it is possible in principle, at the respective interfaces of two layers, for one or both surfaces of the adjacent layers to be physically and/or chemically pretreated to improve their adhesion to one another, in which case for all interfaces which occur in such products, independently of one another, a decision may be made as to whether such pretreatments are to be performed.

In products with three or more layers, one of the further layers may for example be a carrier layer or reinforcing layer, to optimize the stability of the product in prior storage and/or during the sealing process and/or in the ultimate state as a sealing layer. A carrier or reinforcing layer of this kind may consist, for example, of a further suitable polymer film. The carrier or reinforcing layer may take the form of a closed layer, but especially advantageously of a permeable layer, by being perforated, for example, or having slots and/or holes, being formed as a lattice or net or the like, in particular since this makes it possible to reduce or prevent hindrance or prevention of the flow of the upper film layer of the polymeric material, especially for those embodiments in which this upper film layer is of softenable configuration and is intended to exhibit a certain flow onto the sealing site. For such carrier or reinforcing layers, mention may be made, by way of example, of those made of nonwovens or reinforced lattice substances, for example. Especially permeable carrier or reinforcing layers may also be embedded into the thermally activatable adhesive layer, so that this layer is penetrated in particular by the adhesive and a layer of the thermally activatable adhesive layer is present on both sides of these carrier or reinforcing layers.

One of the further layers of an adhesive product having three or more layers may be a barrier layer, for example. Barrier layers is the term for layers which on the basis of their structure and/or chemical composition are suitable for shielding certain permeates. Such barrier layers therefore exhibit a certain protective effect to the outside. The configuration of barrier layers may be such, for example, that they are impermeable or of only low permeability for moisture and/or oxygen. The aforementioned carrier or reinforcing layer may also have a design such that it takes on a barrier function, as set out above.

The method of the invention relates to the positioning of a hot-softenable adhesive product, especially as set out above in general or in special versions, over a substrate, and the heating of the adhesive product to produce sufficient softening of the adhesive, so that the adhesive product bonds to the substrate. In the course of heating, the adhesive product conforms to the surface of the substrate. In the course of the heating, the adhesive is sufficiently tacky to wet the substrate surface sufficiently, and the adhesive product bonds to it. In the course of the heating, in particular, there is curing of the adhesive.

The method of the invention may be used especially advantageously in the automobile industry, here more particularly for the sealing of discontinuities in vehicle bodies, these being surface effects resulting from construction or developed in some other way. Discontinuities in the context of this patent application may occur within a surface—such as within a panel—or else, in particular, at the site between two or more components—more particularly, for instance, two panels; examples would include holes, gaps, offset joins, seam sites, beaded seam sites, rivet sites, weld sites (such as weld spots, weld seams, and the like), punch sites, differences in height (such as step seams, for example), recesses, roof gaps, and the like, without wishing unnecessarily to impose any restriction on the general concept of the invention as a result of this enumeration. The sealing may serve in particular to protect the irregularity from external influences, such as, for example, to seal off the irregularity to the outside and/or for visual enhancement, especially of irregularities which by themselves are visually unattractive.

A protective effect of the sealing of the irregularity results in particular from the fact that in the course of the sealing operation, the adhesive softens, possibly it becoming melt-fluid, and conforms to and wets the substrate bearing the irregularity. In this case, holes, cavities, seams and the like may be filled in, and air inclusions and bubbles may be pressed away from the irregularity by the conforming adhesive, especially for adhesives which are melt-fluid during the sealing operation. The protective effect may be boosted by the adhesive product possessing a barrier effect for permeates. As a result of hardening of the adhesive, especially through the vulcanization and the further curing processes which may take place, the protective effect is long-lasting.

The visual enhancement of the sealing site may be brought about or optimized, for example, through the film layer of the polymeric material, by the film layer covering the layer of adhesive and ensuring outwardly an attractive appearance. If the film layer softens on sealing, this effect may be boosted by the film layer conforming to the adhesive layer and/or sealing the marginal regions thereof, and/or in turn evening out visually disruptive sites in the surface of the adhesive layer. The film layer may be designed in particular such that its surface can be treated in order to improve the visual impression—for instance, by being paintable or otherwise decoratable.

The adhesive product utilized in the invention may be adapted to the shape of the irregularity in the vehicle bodywork, by means of round shaping in the case of the sealing-off of holes, for example, or by a strip shape in the case of sealing-off of seams, beaded seam sites, and the like. The adhesive product may be utilized, for example, for sealing roof joints in an automobile, in order to mask and/or to seal off unsightly sites in the metal, such as a step seam located where the roof panel is welded to the bodywork panel, and/or weld spots that are located there.

An advantageous procedure is to position on the step seam, lengthwise, a strip of the adhesive product that possesses the length of the step seam to be sealed off and is somewhat wider than the width of the step seam. The roof joint to be sealed or panels forming the step seam may be primed or unprimed and painted or unpainted. The roof joint to be sealed may have been wholly or partly sealed off with customary sealants. In one advantageous procedure, the automobile bodywork has been primed with a galvanic coating ahead of the positioning of the adhesive product.

In one advantageous implementation of the method of the invention, the sealing site, after the vulcanization of the adhesive, is painted, especially in customary painting processes in common with the bodywork as a whole, such as by deposition coating, for example. In an alternative procedure, the sealing site may also be given locally confined coating, especially if the bodywork had already been given its final finish before; such coating may take place advantageously with the original paint with which the bodywork as well was painted, or with a different paint, such as a paint which corresponds substantially in color to the vehicle finish and which may have been especially adapted, for example, to the polymeric material of the film layer.

Experimental Section

To produce the adhesives used, first of all polybutadiene-polyurethanes as prepolymers were prepared. The preparation of the polybutadiene-polyurethanes and subsequent production of the adhesives from the polybutadiene-polyurethanes were carried out with the formula compositions as specified for the individual examples.

The polybutadiene-polyurethanes were fabricated in laboratory batches in a heatable and evacuatable 1-liter planetary mixer from PC-Laborsystem. They were prepared in each case by first weighing out the polybutadiene polyols into the mixing canisters, mixing them at a temperature of 80° C. for two hours under reduced pressure, with accompanying devolatilization, and hence freeing them from residual moisture. Then the chain extender was added and was incorporated by mixing for 20 minutes without reduced pressure. Subsequently the remaining substances, such as the catalyst and/or the epoxy resin and/or the tackifier resin and/or the plasticizer and/or the bitumen, for example, were added in the proportions indicated in the individual examples, and incorporated by mixing for 20 minutes. The last addition was that of the at least one aliphatic or alicyclic diisocyanate, which was mixed in homogeneously for 30 minutes at a temperature of approximately 80° C. The mixing canister was removed from the mixer, and given an airtight seal, and the chemically reacting mixture was left to stand in this vessel at 23° C. for seven days in order to complete the reaction. To produce the thermally vulcanizable, meltable adhesive of the invention and the adhesive tape layer of the invention produced from it, the one-week storage time was followed by the admixing of the further substances, such as, in particular, the ground sulfur, optionally the vulcanization accelerators, fillers, and also the further auxiliaries and adjuvants, to the meltable polybutadiene-polyurethane thus prepared, this admixing taking place at 40° C. to 100° C. in the same apparatus. For homogeneous incorporation of the substances, they were mixed in for approximately 30 minutes. Lastly, reduced pressure was applied for around 10 minutes in order to remove moisture and air introduced by stirring. Films in the desired thickness were then produced from the mixtures, by pressing of the mixtures between two siliconized polyester films at around 80° C. After this shaping, the films were cooled to room temperature, causing them to solidify immediately.

In an alternative mode, some of the polybutadiene-polyurethanes were fabricated in a customary heatable and evacuatable 200-liter mixing tank with dissolver stirrer mechanism, from Molteni. They were each prepared by first weighing out the polybutadiene polyols and mixing them under reduced pressure at a temperature of 80° C. for two hours. Then the chain extender was added and was mixed in for 20 minutes without reduced pressure. This was followed by the addition of the remaining substances, such as, for example, catalyst and/or epoxy resin and/or tackifier resin and/or plasticizer and/or bitumen, in accordance with the proportions specified in the individual examples, and they were incorporated by mixing for 20 minutes. The last addition was that of the at least one aliphatic or alicyclic diisocyanate, which was mixed in homogeneously for 30 minutes. The chemically reacting mixtures were let off into a 200-liter drum, which was given airtight sealing, and the mixtures were left to stand at 23° C. for seven days in order to complete the reaction.

To produce the adhesive tape layer of the invention, the polybutadiene-polyurethanes prepared as described above were pumped by means of a drum melt pump at 40° C. to 100° C. into a twin-screw extruder, annular extruder or planetary roller extruder (see details in the individual examples). The extruder was conditioned from the outside to a temperature of around 40° C. to 100° C. The extruder design was such that it ensured effective mixing between polybutadiene-polyurethane and the further adjuvants in a short extruder residence time.

After the mixture had emerged from the extruder, with a temperature of around 40° C. to 100° C., it was shaped directly to a film by means of a downstream roll applicator mechanism, between two incoming polyester films 50 μm thick and siliconized on either side. The speed of the incoming films was varied between 1 m/min and 20 m/min. One of the incoming, double-sidedly siliconized polyester films was immediately removed again after the film had cooled and hence solidified. The present film was subsequently wound onto a cylindrical core. This film is the adhesive tape layer of the invention.

Table 1 below lists the base materials (raw materials) used for preparing the polybutadiene-polyurethane, in each case with tradename, manufacturer, and the technical data relevant to this invention.

TABLE 1

Base materials (raw materials) used for preparing the polybutadiene-polyurethane and also for preparing the comparative examples

| Tradename | Description | Mean number-averaged molar mass $M_n$ (g/mol) | OH or NCO number (mmol OH/kg or mmol NCO/kg) | Mean, number-averaged functionality f | Manufacturer/supplier |
|---|---|---|---|---|---|
| Polybutadiene polyols | | | | | |
| Krasol LBH 2000 ® | Polybutadiene diol | 2100 | 910 | 1.9 | Cray Valley |
| Chain extender | | | | | |
| 2-ethyl-1,3-hexanediol (EHD) | CAS No.: 94-96-2, Diol | 146.2 | 13679.8 | 2.0 | Sigma-Aldrich |
| Diisocyanates | | | | | |
| Desmodur W ® | Dicyclohexylmethane diisocyanate (HMDI), CAS No.: 5124-30-1 | 262 | 7571 | 2.0 | Bayer |
| Catalyst | | | | | |
| Coscat 83 ® | Bismuth trisneodecanoate CAS No.: 34364-26-6 | | | | Caschem |
| Epoxy resins | | | | | |
| Epikote 828 ® | Reaction product of bisphenol A and epichlorohydrin CAS No.: 25068-38-6 | | | | Brenntag |

Table 2 below lists the base materials (raw materials) used additionally for the adhesives and adhesive tape layers of the invention produced from the polybutadiene-polyurethanes. The stated raw materials are all freely available commercially.

TABLE 2

Base materials (raw materials) used for producing the adhesives and adhesive tape layers of the invention from the polybutadiene-polyurethanes

| Tradename | Description | Manufacturer/supplier |
|---|---|---|
| Vulcanizing agents and accelerators | | |
| Mahlschwefel 80/90° | Soluble ground sulfur, CAS No.: 7704-34-9 | Avokal GmbH |
| ZBEC | Zinc bis(dibenzyldithiocarbamate), CAS No.: 14726-36-4 | Weber & Schaer GmbH |
| Avorator ZBEC 70 GE | Zinc bis(dibenzyldithiocarbamate), CAS No.: 14726-36-4 (70% by mass) batched in EPDM /SBR | Weber & Schaer GmbH |
| TBzTD | Tetrabenzylthiuram disulfide, CAS No.: 10591-85-2 | Weber & Schaer GmbH |
| Carbon blacks | | |
| Levanyl ® NFL | Aqueous carbon black dispersion 40%, max. 1000 mPa · s (23° C.) | RheinChemie Additive |
| Luvomaxx NC 220 | Beaded carbon black | Lehmann&Voss |
| Fillers | | |
| Talkum Pharma M ® | Talc, CAS No.: 14807-96-6, spec. surface area: 4.6 m²/g | Scheruhn GmbH |
| Omyacarb 5-GU ® | Ground chalk, mean particle diameter: 5.5 μm | Omya |
| Rapidquell ®Quicklime CL 90-Q | Calcium oxide, sieve residue > 90 μm: 3% by mass | Rheinkalk GmbH |
| Kettlitz-Kezadol | Phlegmatized calcium oxide, sieve residue ≥ 45 μm: 0.10% by mass | Heinrich Heller GmbH |
| Kaolin Pharma | Kaolinite 88.0% by mass, sieve residue ≥ 45 μm: 0.10% by mass | Heinrich Heller GmbH |
| Tiona 595 | Surface-treated titanium dioxide | Cristal |
| Garamite 1958 | Organically modified clay mineral mixture, rheology modifier | Byk-Chemie GmbH |

TABLE 2-continued

Base materials (raw materials) used for producing the adhesives and
adhesive tape layers of the invention from the polybutadiene-polyurethanes

| Tradename | Description | Manufacturer/ supplier |
|---|---|---|
| Plasticizer | | |
| Benzoflex ® 9-88 | Oxydipropyl dibenzoate, CAS No.: 27138-31-4 | Eastman Chemicals |
| Antioxidants | | |
| Irganox 1010 | Pentaerythritol tetrakis(3-(3,5-di-tert-butyl-4-hydroxy-phenyl)-propionate), CAS No.: 6683-19-8 | BASF |

Production of the Carrier Material of the Invention:

The carrier layer used in accordance with the invention was a film layer of a polymeric material. This film layer was produced by means of a single-screw extruder in a flat film process. The film web obtained through the extrusion runs flat in the production plane. The shaping tool used is a slot die. The typical procedure in flat film extrusion is as described below. First of all, the respective polymeric material used for film production (identified below as polymer) is melted in the single-screw extruder. The melt emerges from a shaping tool in the form of a slot die. Subsequent cooling is on a chill roll. Electrostatic charging places the film web onto the surface of the chill roll. Downstream of the chill roll, the thickness uniformity is checked and the film web is guided via further rolls for winding. The thickness tolerances in the production process did not exceed 10%. Before final winding, the edge of the film webs was trimmed on either side. For the admixing of additives (such as, for example, color pigments, UV stabilizers, etc.), it is possible to utilize master batch systems (see the individual examples). These pelletized master batches comprise the corresponding additives in a high concentration in a polymer matrix, and can be blended with the polymer pellets for processing, in the desired concentration, before being added to the extruder. The process conditions (such as, for example, temperatures in the extruder, temperature of the chill roll, etc.) are adapted to the particular polymer being processed and to the requirements with regard to the film, in line with usual process regimes.

EXAMPLES

Adhesive products of the invention that are used are two-ply constructions. The lower layer, oriented to the substrate side, consists of a reactive (thermally activatable) adhesive; the upper layer, which is the layer to be coated, consists of a polymeric carrier material which is non-tacky at room temperature (film layer of a polymeric material). Both materials can be compounded and also coextruded in an extruder or other mixing assembly. Alternatively one layer may be shaped first and then the second layer may be coated onto the first, or both layers may be shaped separately and subsequently laminated. The specific mode of producing the two-ply adhesive products in accordance with the individual examples is indicated in each of them.

Example 1

For the thermally activatable adhesive layer, in a first implementation corresponding to the general procedure specified, a polybutadiene-polyurethane is prepared in the presence of an epoxy resin (Epikote 828®). The polybutadiene-polyurethane (PBD-PU) is made up, including the epoxy resin, as listed below in Table 3.

TABLE 3

PBD-PU composition

| Raw material | Weight fraction [wt %] | Number of OH/NCO groups introduced, based on the percentage weight fraction | Percentage ratio of the number of OH groups to one another |
|---|---|---|---|
| Krasol LBH 2000 ® | 61.67 | 56.12 mmol OH | 50 |
| 2-Ethyl-1,3-hexanediol (EHD) | 4.10 | 56.12 mmol OH | 50 |
| Coscat 83 ® | 0.15 | | |
| Desmodur W ® | 14.08 | 106.62 mmol NCO | |
| Epikote 828 ® | 20.00 | | |
| Total | 100.00 | | |

Preparation took place in a 200 liter mixing vessel. The weight fraction of Desmodur W® is calculated here such that the NCO/OH ratio of the polyurethane is 0.95. The theoretical gel point is computed to be 1.0. PBD-PU (including epoxy resin) is solid at room temperature, meltable, and rubberlike and pressure-sensitive adhesive in its consistency.

Adhesive and Adhesive Layer:

The PBD-PU (including epoxy resin), for producing the reactive (thermally activatable) adhesive and the adhesive layer, was blended further in accordance with the below-specified formula in a twin-screw extruder. The raw materials used during the preparation of the polybutadiene-polyurethane itself are likewise listed in Table 3 above. Production and coating took place in accordance with the general procedure as specified above.

Adhesive Layer:

The adhesive layer of this example is as follows:
35.2 parts Krasol LBH 2000
2.3 parts EHD
8 parts dicyclohexylmethane diisocyanate (HMDI)
0.1 part neodecanoate bismuth salt
11.4 parts Epikote 828
3.5 parts microfine, double-refined sulfur
1.5 parts ZBEC
1.5 parts TBzTD
3.5 parts calcium oxide
4.4 parts talc
28.2 parts chalk
0.4 parts Levanyl Further, the thickness of the adhesive layer is 500 μm.

The softening temperature and viscosity of the reactive adhesive layer thus produced according to this example are listed below in Table 4.

TABLE 4

Softening temperature and viscosity of Example 1

| | Start, softening, tan d = 1 [° C.] | tan d = 1; cross-linking, [° C.] | tan d MAX [° C.], greatest liquefaction | Viscosity at 23° C., 10 rad/s [Pa · s] | Viscosity at 80° C., 10 rad/s [Pa · s] |
|---|---|---|---|---|---|
| Adhesive Example 1 | 37 | 113 | 88 | 40 000 | 700 |

Carrier Layer:

The film layer of polymeric material (carrier layer) is produced in accordance with the above-specified general procedure from a semicrystalline copolyester E1 having a softening temperature of 80° C. and a glass transition temperature of −25° C., giving a film having the following characteristics: softening temperature 80° C.; glass transition temperature −25° C.; tensile elongation 500%; melt viscosity (to DIN EN ISO 1133-1): 111 Pa·s (160° C.); and layer thickness: 400 μm. The carrier layer produced possesses a softening temperature of 80° C. and a viscosity of 29 000 Pa·s at 23° C. and 6000 Pa·s at 80° C. (using a parallel plate vibrational rheometer; 10 rad/s, 1% deformation, otherwise in accordance with ISO 6721-10). The carrier layer was subsequently laminated onto the adhesive layer at 50° C. The adhesive product was cured at 130° C. in 30 minutes.

Examples 2 and 3

For the thermally activatable adhesive layer, in a first implementation, a polybutadiene-polyurethane is prepared in accordance with the general procedure in each case. The polybutadiene-polyurethane (PBD-PU) is prepared from the same raw materials and by the same method as in Example 1.

Adhesive and Adhesive Layer:

The PBD-PU, for producing the reactive (thermally activatable) adhesive and the adhesive layer, was blended further in accordance with the below-specified formula in an annular extruder. The raw materials used during the preparation of the polybutadiene-polyurethane itself are likewise listed in Table 3 above. Production and coating took place in accordance with the general procedure as specified above.

Adhesive Layer:

The adhesive layer of this example is as follows:
  35.2 parts Krasol LBH 2000
  2.3 parts EHD
  8 parts dicyclohexylmethane diisocyanate (HMDI)
  0.1 part neodecanoate bismuth salt
  11.4 parts Epikote 828
  3.5 parts microfine, double-refined sulfur
  1.5 parts ZBEC
  1.5 parts TBzTD
  3.5 parts calcium oxide
  4.4 parts talc
  28.6 parts chalk Further, the thickness of the adhesive layer is 500 μm.

Carrier Layers:

To produce the carrier layer of the invention for examples 2 and 3, the copolyesters E2 (softening temperature 85° C., glass transition temperature −25° C.) and copolyester E3 (softening temperature 135° C., glass transition temperature −24° C.) were used, respectively. The single-layer carrier films were each produced in a flat film process, as already described in Example 1, and they have the respectively reported specifications.

Carrier Layer T-B2:

The carrier layer T-B2 is given by the following:

100 parts semicrystalline copolyester E2; softening temperature 85° C.; glass transition temperature −25° C.; tensile elongation >400%; melt viscosity (DIN EN ISO 1133-1): 80 Pa·s (160° C.); and layer thickness: 400 μm.

Carrier Layer T-B3:

The carrier layer T-B3 is given by the following:

100 parts semicrystalline copolyester E3; softening temperature 135° C.; glass transition temperature −24° C.; tensile elongation >400%; melt viscosity (DIN EN ISO 1133-1): 250 Pa·s (160° C.); and layer thickness: 400 μm.

Adhesive Products:

The respective carrier layer was subsequently laminated onto the adhesive layer at room temperature, to give Example 2 with the carrier layer T-B2, and Example 3 with the carrier layer T-B3.

Example 4

For the thermally activatable adhesive layer, in a first implementation, a polybutadiene-polyurethane is prepared. The polybutadiene-polyurethane (PBD-PU) is prepared from the same raw materials and by the same method as in Example 1.

Adhesive and Adhesive Layer:

The PBD-PU (including epoxy resin), for producing the reactive (thermally activatable) adhesive and the adhesive layer, was blended further in accordance with the below-specified formula in a planetary roller extruder. The raw materials used during the preparation of the polybutadiene-polyurethane itself are likewise listed in Table 3 above. Production and coating took place in accordance with the general procedure as specified above; adhesive layers of differing thicknesses were produced.

Adhesive Layer:

The adhesive layer of this example is as follows:
  35.2 parts Krasol LBH 2000
  2.3 parts EHD
  8 parts dicyclohexylmethane diisocyanate (HMDI)
  0.1 part neodecanoate bismuth salt
  11.4 parts Epikote 828
  3.5 parts microfine, double-refined sulfur
  1.5 parts ZBEC
  1.5 parts TBzTD
  3.5 parts calcium oxide
  4.4 parts talc
  27.7 parts chalk
  0.4 part Levanyl
  0.5 part Garamite 1958

Further, the thickness variation of the adhesive layer is: 70 μm, 100 μm, 250 μm, 400 μm, 500 μm, 1000 μm.

The adhesive of the adhesive layers produced may be characterized as follows in Table 5 below.

TABLE 5

Softening temperature and viscosity of Examples 1 and 4

| Sample | Start, softening, tan d = 1; [° C.] | tan d = 1; cross-linking, [° C.] | tan d MAX [° C.], greatest liquefication | Viscosity at 23° C., 10 rad/s [Pa · s] | Viscosity at 80° C., 10 rad/s [Pa · s] |
|---|---|---|---|---|---|
| Adhesive Example 4 | 37 | 118 | 72 | 80 000 | 1500 |
| Adhesive Example 1* | 37 | 113 | 88 | 40 000 | 700 |

*for comparison, see above in Example 1

Carrier Layer:

The film layer of the polymeric material (carrier layer) is produced in accordance with the above-specified general procedure from 95 parts by weight of the semicrystalline copolyester E2 a and 5 parts by weight of Garamite® 1958. Garamite® 1958 was admixed to the copolyester matrix as a master batch. The result is a film having the following characteristics: softening temperature 85° C.; glass transition temperature −25° C.; tensile elongation >400%; melt viscosity (to DIN EN ISO 1133-1): 157 Pa·s (160° C.); and layer thickness: 400 μm.

Adhesive Products:

After the shaping of the adhesive into adhesive layers, the carrier layer was laminated in-line onto the adhesive layers of different thicknesses, at around 80° C. The adhesive product was cured at 160° C. in 30 minutes. Adding rheological assistants (Garamite® 1958) allows the viscosity of both the adhesive layer and the carrier layer to be favorably increased, resulting in very good optical quality even on vertical curing. Moreover, a rheological assistant in the adhesive layer improves the dimensional stability of the adhesive layer in the uncured state.

Example 5

For the thermally activatable adhesive layer, in a first implementation, a polybutadiene-polyurethane is prepared. The polybutadiene-polyurethane (PBD-PU) is prepared from the same raw materials and by the same method as in Example 1.

Adhesive and Adhesive Layer:

The PBD-PU (including epoxy resin), for producing the reactive (thermally activatable) adhesive and the adhesive layer, was blended further in accordance with the below-specified formula in a planetary roller extruder. The raw materials used during the preparation of the polybutadiene-polyurethane itself are likewise listed in Table 3 above. Production and coating took place in accordance with the above-specified general procedure.

Adhesive Layer:

The adhesive layer of this example is as follows:
35.2 parts Krasol LBH 2000
2.3 parts EHD
8 parts dicyclohexylmethane diisocyanate (HMDI)
0.1 part neodecanoate bismuth salt
11.4 parts Epikote 828
3.5 parts microfine, double-refined sulfur
1.5 parts ZBEC
1.5 parts TBzTD
3.5 parts calcium oxide
4.4 parts talc
27.7 parts chalk
0.4 part Levanyl
0.5 part Garamite 1958

Further, the thickness of adhesive layer is 250 μm.

Carrier Layer:

The film layer of the polymeric material (carrier layer) is produced in accordance with the above-specified general procedure from the semicrystalline copolyester E1, to give a film having the following characteristics: softening temperature 80° C.; glass transition temperature −25° C.; tensile elongation 500%; melt viscosity (to DIN EN ISO 1133-1): 111 Pa·s (160° C.); and layer thickness: 100 μm.

Adhesive Product:

The open side of the adhesive layer was first laminated with a nonwoven web (basis weight 13 g/m²; long-fiber paper of high wet strength from Glatfelter, cellulose-based, thickness 38 μm). The carrier layer was subsequently laminated at 50° C. onto the nonwoven layer. The adhesive product was cured at 160° C. for 30 minutes. The use of a nonwoven web or layer gave an additional dimensional stability during application.

Example 6

For the thermally activatable adhesive layer, in a first implementation, a polybutadiene-polyurethane is prepared. The polybutadiene-polyurethane (PBD-PU) is prepared from the same raw materials and by the same method as in Example 1.

Adhesive and Adhesive Layer:

The PBD-PU (including epoxy resin), for producing the reactive (thermally activatable) adhesive and the adhesive layer, was blended further in accordance with the below-specified formula in an annular extruder. The raw materials used during the preparation of the polybutadiene-polyurethane itself are likewise listed above in Table 3. Production and coating took place in accordance with the above-specified general procedure.

Adhesive Layer:

The adhesive layer of this example is as follows:
35.2 parts Krasol LBH 2000
2.3 parts EHD
8 parts dicyclohexylmethane diisocyanate (HMDI)
0.1 part neodecanoate bismuth salt
11.4 parts Epikote 828
3.5 parts microfine, double-refined sulfur
2 parts ZBEC
2 parts TBzTD
3.5 parts phlegmatized calcium oxide
4.4 parts talc
25.6 parts chalk
1.5 parts titanium dioxide
0.5 part Garamite 1958

Further, the thickness of the adhesive layer is 250 μm.

Carrier Layer:

The film layer of the polymeric material (carrier layer) is produced in accordance with the above-specified general procedure from 95 parts by weight of the semicrystalline copolyester E3 and 5 parts by weight of fumed silica (silicon dioxide, Aerosil® 200, 12 μm primary particle size, 200 m²/g surface area (BET); from Evonik). The fumed silica was admixed to the copolyester matrix as a master batch. The result is a film having the following characteristics: softening temperature 138° C.; glass transition temperature −24° C.; tensile elongation >400%; melt viscosity (DIN EN ISO 1133-1): 284 Pa·s (160° C.); and layer thickness: 300 μm.

Adhesive Product:

The carrier layer was first shaped. The reactive adhesive was subsequently extruded onto the carrier layer at 73° C. The adhesive product was cured at 130° C. for 30 minutes. The use of the phlegmatized calcium oxide in the adhesive layer reduces the formation of gel specks during the shaping of the adhesive layer and prevents premature uptake of moisture. This is beneficial to the optical qualities and the durability of the adhesive tape.

Examples 7 and 8

For the thermally activatable adhesive layer, in a first implementation, a polybutadiene-polyurethane is prepared. The polybutadiene-polyurethane (PBD-PU) is prepared from the same raw materials and by the same method as in Example 1.

Adhesive and Adhesive Layer:

The PBD-PU (including epoxy resin), for producing the reactive (thermally activatable) adhesive and the adhesive layer, was blended further in accordance with the below-specified formula in an annular extruder. The raw materials used during the preparation of the polybutadiene-polyurethane itself are likewise listed above in Table 3. Production and coating took place in accordance with the above-specified general procedure.

Example 7—Adhesive Layer

The adhesive layer of this example is as follows:
38.8 parts Krasol LBH 2000
2.5 parts EHD
8.8 parts dicyclohexylmethane diisocyanate (HMDI)
0.1 part neodecanoate bismuth salt
12.6 parts Epikote 828
3.5 parts microfine, double-refined sulfur
1.5 parts ZBEC
1.5 parts TBzTD
3.5 parts phlegmatized calcium oxide
4.4 parts talc
21.1 parts chalk
1.5 parts titanium dioxide
0.2 part Disparlon 6500 (polyamide wax, Erbslöh)
Further, the thickness of the adhesive layer is 400 μm.

Example 8—Adhesive Layer

The adhesive layer of this example is as follows:
38.8 parts Krasol LBH 2000
2.5 parts EHD
8.8 parts dicyclohexylmethane diisocyanate (HMDI)
0.1 part neodecanoate bismuth salt
12.6 parts Epikote 828
3.5 parts microfine, double-refined sulfur
2 parts ZBEC
2 parts TBzTD
3.5 parts phlegmatized calcium oxide
4.4 parts talc
20.1 parts chalk
1.5 parts titanium dioxide
0.2 part Disparlon 6500 (polyamide wax, Erbslöh)
Further, the thickness of the adhesive layer is 400 μm.
Carrier Layer:

The film layer of the polymeric material (carrier layer) is produced in each case in accordance with the above-specified general procedure from 95 parts by weight of the semicrystalline copolyester E3 and 5 parts by weight of Garamite® 1958. The Garamite 1958 was admixed to the copolyester matrix as a master batch. The result is a film having the following characteristics: softening temperature 138° C.; glass transition temperature −24° C.; tensile elongation >400%; melt viscosity (DIN EN ISO 1133-1) 295 Pa·s (160° C.); and layer thickness: 70 μm.

Adhesive Product Production:

The carrier layers were first shaped. Thereafter the reactive adhesive was extruded onto the carrier layer in each case at 73° C. The adhesive products were cured at 130° C./160° C. for 30 minutes. An increased fraction of ultra accelerators in the adhesive layer leads to increased lap shear strengths of the adhesive layer particularly at low curing temperatures (130° C./30 min). The substrate adhesion is improved. The Disparlon 6500 polyamide wax, moreover, leads to very good sealing in spite of the high dimensional stability of the uncured adhesive layer.

Lap shear strengths of the adhesive layers of Examples 7 and 8 as per ISO 4587 (but in a modification with 400 μm adhesive layers instead of with 200 μm; measurement at the particular specified temperature) are given below in Table 6.

TABLE 6

Lap shear strength of the adhesive layers of Examples 7 and 8

| Adhesive layer as per Example | Cure time | Cure temperature | Steel test specimen (ASTM 1.4301) −35° C. | ASTM 1.4301 steel test specimen RT | ASTM 1.4301 steel test specimen +95° C. |
|---|---|---|---|---|---|
| 7 | 30 min | 130° C. | 24.1 ± 2.3 MPa | 5.74 ± 1.23 MPa | 0.9 ± 0.6 MPa |
| 7 | 30 min | 160° C. | 24.5 ± 1.1 MPa | 8.86 ± 1 MPa | 1.62 ± 0.9 MPa |
| 8 | 30 min | 130° C. | 26.1 ± 2.0 MPa | 7.88 ± 0.4 MPa | 1.75 ± 0.4 MPa |
| 8 | 30 min | 160° C. | 26.3 ± 2.5 MPa | 11.1 ± 1.47 MPa | 2.81 ± 0.4 MPa |

Example 9

For the thermally activatable adhesive layer in a first implementation a polybutadiene-polyurethane is produced. The polybutadiene-polyurethane (PBD-PU) is produced from the same raw materials and with the same method as in Example 1.

Adhesive and Adhesive Layer:

The PBD-PU (including epoxy resin), for producing the reactive (thermally activatable) adhesive and the adhesive layer, was blended further in accordance with the below-specified formula in a planetary roller extruder, and devolatilized in a downstream assembly. The raw materials used during the preparation of polybutadiene-polyurethane itself are likewise listed above in Table 3. Production and coating took place in accordance with the above-specified general procedure.

Adhesive Layer:

The adhesive layer of this example is as follows:
38.8 parts Krasol LBH 2000
2.5 parts EHD
8.8 parts dicyclohexylmethane diisocyanate (HMDI)
0.1 part neodecanoate bismuth salt
12.6 parts Epikote 828
3.5 parts microfine, double-refined sulfur
1.5 parts Avorator ZBEC 70 GE
1.5 parts TBzTD
3.5 parts phlegmatized calcium oxide 4.4 parts talc
14.3 parts chalk
1.5 parts titanium dioxide
7 parts fumed silica (Aerosil R202, silicon dioxide with polydimethylsiloxane surface treatment, 14 μm primary particle size, 100 m²/g surface area (BET); from Evonik)

Further, the thickness of the adhesive layer is 400 μm.

Carrier Layer:

The film layer of the polymeric material (carrier layer) is produced in accordance with the above-specified general procedure from 95 parts by weight of the semicrystalline copolyester E3 and 5 parts by weight of Garamite 1958. Garamite 1958 was admixed to the copolyester matrix as a master batch. This gives a film having the following characteristics: softening temperature 138° C.; glass transition temperature −24° C.; tensile elongation >400%; melt viscosity (to ISO 1133): 295 Pa·s (160° C.); and layer thickness: 50 μm.

Adhesive Products:

The carrier layer was first shaped. The reactive adhesive was subsequently extruded onto the carrier layer at 74° C. The adhesive product was cured at 160° C. for 30 minutes. The use of batched ultra accelerator (Avorator ZBEC 70 GE) allows the storage stability of the adhesive tape to be increased.

Example 10

For the thermally activatable adhesive layer in a first implementation a polybutadiene-polyurethane is produced. The polybutadiene-polyurethane (PBD-PU) is produced from the same raw materials and with the same method as in Example 1.

Adhesive and Adhesive Layer:

The PBD-PU (including epoxy resin), for producing the reactive (thermally activatable) adhesive and the adhesive layer, was blended further in accordance with the below-specified formula in an annular extruder. The raw materials used during the preparation of polybutadiene-polyurethane itself are likewise listed above in Table 3. Production and coating took place in accordance with the above-specified general procedure.

Adhesive Layer:

The adhesive layer of this example is as follows:
35.2 parts Krasol LBH 2000
2.3 parts EHD
8 parts dicyclohexylmethane diisocyanate (HMDI)
0.1 part neodecanoate bismuth salt
11.4 parts Epikote 828
5 parts microfine, double-refined sulfur
1.5 parts ZBEC
1.5 parts TBzTD
10 parts phlegmatized calcium oxide
23.3 parts kaolin
1.5 parts titanium dioxide
0.2 part carbon black, beaded Further, the thickness of the adhesive layer is 250 μm.

Carrier Layer:

The film layer of the polymeric material (carrier layer) is produced in accordance with the above-specified general procedure from 95 parts by weight of the semicrystalline copolyester E3 and 5 parts by weight of Garamite® 1958. Garamite® 1958 was admixed to the copolyester matrix as a master batch. This gives a film having the following characteristics: softening temperature 138° C.; glass transition temperature −24° C.; tensile elongation >400%; melt viscosity (to ISO 1133): 295 Pa·s (160° C.); and layer thickness: 100 μm.

Adhesive Product:

The carrier layer was first shaped. The reactive adhesive was subsequently extruded onto the carrier layer at 74° C. The adhesive product was cured at 170° C. for 30 minutes. The use of kaolin in the adhesive layer makes further rheological assistants unnecessary. Kaolin hinders the sagging of the adhesive layer on vertical curing, while nevertheless leading to sufficient sealing.

Example 11

For the thermally activatable adhesive layer in a first implementation a polybutadiene-polyurethane is produced. The polybutadiene-polyurethane (PBD-PU) is produced from the same raw materials and with the same method as in Example 1.

Adhesive and Adhesive Layer:

The PBD-PU (including epoxy resin), for producing the reactive (thermally activatable) adhesive and the adhesive layer, was blended further in accordance with the below-specified formula in an annular extruder. The raw materials used during the preparation of polybutadiene-polyurethane itself are likewise listed above in Table 3. Production and coating took place in accordance with the above-specified general procedure.

Adhesive Layer:

The adhesive layer of this example is as follows:
38.8 parts Krasol LBH 2000
2.5 parts EHD
8.8 parts dicyclohexylmethane diisocyanate (HMDI)
0.1 part neodecanoate bismuth salt
12.6 parts Epikote 828
9 parts Benzoflex 9-88
3.5 parts microfine, double-refined sulfur
2 parts ZBEC
2 parts TBzTD
3.7 parts phlegmatized calcium oxide
6 parts talc
9.5 parts fumed silica (Aerosil R202, Evonik)
1.5 parts titanium dioxide Further, the thickness of the adhesive layer is 400 μm.

Carrier Layer:

The film layer of the polymeric material (carrier layer) is produced in accordance with the above-specified general procedure from 95 parts by weight of the semicrystalline copolyester E3 and 5 parts by weight of Garamite® 1958. Garamite® 1958 was admixed to the copolyester matrix as a master batch. This gives a film having the following characteristics: softening temperature 138° C.; glass transition temperature −24° C.; tensile elongation >600%; melt viscosity (to DIN EN ISO 1133-1): 295 Pa·s (160° C.); and layer thickness: 70 μm.

Adhesive Product:

The carrier layer was first shaped. The reactive adhesive was subsequently extruded onto the carrier layer at 74° C. The adhesive product was cured at 140° C. for 20 minutes. The Benzoflex 9-88 plasticizer results in an improved tack on the part of the adhesive layer, and consequently in greater ease of application of the adhesive tape.

Comparative Examples 12 to 18

For the adhesive layers in a first implementation a polybutadiene-polyurethane is prepared. The polybutadiene-polyurethane (PBD-PU) is prepared from the same raw materials and by the same method as in Example 1. For producing the reactive (thermally activatable) adhesive and the adhesive layer, the PBD-PU was blended further in accordance with the below-specified formula in an annular extruder. The raw materials used during the preparation of the polybutadiene-polyurethane itself are likewise listed above in Table 3. Production and coating took place in accordance with the above-specified general procedure.

Adhesive Layer:

The adhesive layer of each of these examples is as follows:
  35.2 parts Krasol LBH 2000
  2.3 parts EHD
  8 parts dicyclohexylmethane diisocyanate (HMDI)
  0.1 part neodecanoate bismuth salt
  11.4 parts Epikote 828
  3.5 parts microfine, double-refined sulfur
  1.5 parts ZBEC
  1.5 parts TBzTD
  3.5 parts calcium oxide
  4.4 parts talc
  28.6 parts chalk Further, the thickness of each of these adhesive layers is 500 μm.

Carrier Layers:

To produce the carrier layers, the raw materials in powder or pellet form were heated in a laboratory press at 20° C. above the melting range specified by the manufacturer, and were pressed to a layer thickness of 200 μm between two siliconized release papers. Characteristics of these raw materials are contained in Table 7 below; for comparison, the characteristics of inventive Examples 1 to 3 are likewise listed in Table 7 below. One raw material was used for each example for producing the carrier layer.

underwent the typical coating construction. The chemicals used and the curing procedure are found in Table 8 below.

TABLE 8

Coating procedure for Examples 1-11 and Comparative Examples 12-18

| Manufacturer | Name | Number | Handling |
|---|---|---|---|
| BASF | Surfacer: Secubloc gray | FU48-9000-0002 | Flash off 5-10 min at room temperature (RT), Oven: 1. 20 min 80° C., 2. 30 min 160° C. |
| BASF | Basecoat: COLORBrite Uni, black | FV71-94M3-0005 | Flash off 5-10 min RT, Oven: 20 min 80° C. |
| BASF | 2-component clearcoat | FF99-0374 0305, curing agent SC29-0160 0001 | Ratio FF99-0374 0305: SC29-0160 0001 100:33 (parts by weight), Flash off 5-10 min RT, Oven: 30 min 140° C. |

The inventive and the noninventive examples were evaluated on the basis of the following tests and the results listed in Table 9 below:

Visual Assessment (Horizontally Cured), Including Blister Assessment:

The assessment was made after coating and subsequent constant humidity storage (100% r.H., 40° C., 240 h). Evaluation according to ISO 4628-2.

Paint Adhesion (EN ISO 2409:2013):

In the construction under test, a lattice (six parallel cuts) is scored through the paint down to the adhesive product (cross-cut tester Zehntner ZCC 2087). Thereafter a trans-

TABLE 7

Characteristics of Examples 1-3 and Comparative Examples 12-18

| Example | Carrier material | Glass Transition temperature [° C.] | Softening [° C.] | Elongation at break [%] at −20° C., in combination with reactive adhesive layer (Iso 527-3) | Water absorption [%] | Viscosity [Pa * s] | MFR (160° C., 2.16 kg) |
|---|---|---|---|---|---|---|---|
| 1 | Semicrystalline copolyester 1 (E1) | −25 | 80 | 19 | 2.5 | 111 (160° C.) | 110 |
| 2 | Semicrystalline copolyester 2 (E2) | −25 | 85 | 17 | 2.5 | 80 (160° C.) | 100 |
| 3 | Semicrystalline copolyester 3 (E3) | −24 | 135 | 15 | 2.5 | 250 (160° C.) | 42 |
| 12 | Polyamide (A1) | 17 | 125 | 2 | 4.9 | 600 (160° C.) | 18 |
| 13 | Polyvinyl butyral (PVB) | 63 | 150 | 1 | 5 | — | 2 |
| 14 | Semicrystalline copolyester 4 (E4) | −11 | 114 | 7 | 2.5 | 320 (160° C.) | 33 |
| 15 | Semicrystalline copolyester 5 (E5) | 19 | 120 | 1 | 2.1 | 350 (160° C.) | 30 |
| 16 | Ethylene-acrylic acid copolymer (EAA) | −12 | 95 | 1 | 5.6 | 65 (140° C.) | — |
| 17 | Ionomer (IO) | 6.50 | 95 | 1 | 2.6 | — | 2.5 |
| 18 | Polyimide (I) | — | — | 91 | 2.8 | — | — |

Adhesive Products:

The respective carrier layer was subsequently laminated onto the adhesive layer at room temperature.

Further Results

In order to evaluate the properties of the Examples, the respective adhesive product was subjected to a coating operation. For this purpose the tape in uncured form was applied to a CEC-coated steel panel, and subsequently parent polyethylene film tape (tesa 4668, peel adhesion 3.4 N/cm (steel)) is adhered to the resulting grid. This tape is pulled off sharply at an angle of 60°. Evaluation takes place by considering the remaining lattice and evaluating the adhesion using comparative images from standard ISO 2409. The less paint removed, the better the adhesion. The cross-cut test is preceded by a constant humidity test (98% r.H., 40° C., 240 h). Characteristic cross-cut values (Gt) are used for the evaluation. The characteristic value 0 corresponds to very good adhesive strength, 5 to very poor adhesive strength:

Gt. 0: No peeling or flaking. The cut edges are completely smooth. None of the squares in the lattice has undergone delamination.

Gt. 1: Traces of peeling or flaking along the cuts. No fragments of the coating have undergone delamination at the cut points of the lattice lines. Delaminated area not greater than 5% of the cross-cut area.

Gt. 2: Jagged flaking along the cuts. The coating has undergone delamination along the cut edges or at the cut points of the lattice lines. Delaminated area greater than 5% but not greater than 15% of the cross-cut area.

Gt. 3: Jagged flaking along the cuts. The coating has undergone delamination along the cut edges, partly or entirely, in broad strips, and/or a number of squares have undergone partial or complete delamination. Delaminated area greater than 15% but not greater than 35% of the cross-cut area.

Gt. 4: Flaking over virtually the entire area of the scored grid. The coating has undergone delamination in broad strips along the cut edges, or certain squares have undergone partial or complete delamination. Delaminated surface area greater than 35% but not greater than 65% of the cross-cut area.

Gt. 5: Flaking beyond the area of the scored grid. Any delamination that cannot be classed more than characteristic cross-cut value 4.

Sealing Properties:

The sealing is assessed using a sample construction. In this case a metal panel measuring 20×100×1 mm (stainless steel ASTM 1.4301) is bonded to a glass plate 200×50 mm in size. To verify the sealing capacity, the adhesive product under test, 20×100 mm), is bonded in terms of length over the 1 mm step formed as a result of this construction. The adhesive product is preferably applied such that a corner of the metal panel is also overstuck. Under the stated processing conditions, this construction can be cured vertically in an oven (for example 160° C., 30 min). An assessment is subsequently made, from the underside of the glass, of the extent to which the adhesive product has flowed into the step to be sealed between metal panel and glass.

TABLE 9

Further testing results of Examples 1-11 and Comparative Examples 12-18

| 500 μm adhesive layer with 400 μm carrier layer: | Blister assessment (Iso 4628-2) after coating and constant humidity test (first line), and general visual rating (horizontally cured) (second line) | Paint adhesion (EN ISO 2409) | Sealing properties (1 mm high step) |
|---|---|---|---|
| Example 1 | 1(S1) (good surface) | Gt 0 | +++ |
| Example 2 | 1(S1) (good surface) | Gt 0 | +++ |
| Example 3 | 0(S0) (good surface) | Gt 0 | + |
| Example 4 (all adhesive layer thicknesses) | 2(S2) (good surface) | Gt 0 | ++ |
| Example 5 | 1(S1) (good surface) | Gt 0 | + |
| Example 6 | 0(S0) (good surface) | Gt 0 | + |
| Example 7 | 0(S0) (good surface) | Gt 0 | +++ |
| Example 8 | 0(S0) (good surface) | Gt 0 | +++ |
| Example 9 | 0(S0) (good surface) | Gt 0 | +++ |
| Example 10 | 0(S0) (good surface) | Gt 0 | ++ |
| Example 11 | 0(S0) (good surface) | Gt 0 | +++ |
| Comparative example 12 | 0(S0) (good surface) | Gt 0 | − |
| Comparative example 13 | 0(S0) (good surface) | Gt 1 | − |
| Comparative example 14 | 0(S0) (good surface) | Gt 0 | − |
| Comparative example 15 | 0(S0) (good surface) | Gt 0 | − |
| Comparative example 16 | 4(S3) (blisters in surfacer, drops formed) | Gt 5 | ++ |
| Comparative example 17 | 2(S2) (smooth surface, slight waves) | Gt 4 | − |
| Comparative example 18 | 3(S2) smooth surface with blisters | Gt 3 | − |

From the Examples it can be seen that the selected types of polymer as carrier material differ in the effectiveness with which they build up anchoring to the coating (paint adhesion). The nonpolar carrier materials lead to no sufficient paint adhesion (Examples 16,17). Carrier materials which enter into interaction with the coating can be painted particularly effectively (Examples 1 to 11 and Comparative Examples 12 to 15).

For the sealing properties of the seam seal, the carrier material bears a high level of joint responsibility: if the softening temperature selected is too high (Example 13), no effective sealing can take place. Only if this transition temperature is selected sufficiently low, as in the inventive Examples 1-11, is it possible for there to be sufficient sealing. Moreover, the melt viscosity of the carrier materials is critical to the sealing. If a carrier material has too high a viscosity for flow or does not possess a softening temperature (Examples 12-15, and 17-18), here again there can be no sealing, in spite of correctly selected softening temperature.

The carrier materials from the Comparative Examples 12-17 all possess a high glass transition temperature, hence resulting in brittle fraction at low temperatures. The materials lose their elasticity. As a result, the sealing loses its function at sub-zero temperatures (−20° C.).

The invention claimed is:

1. A method for sealing discontinuities in vehicle bodywork, comprising:
   providing an at least two-layered adhesive product which comprises at least one thermally activatable adhesive layer and a film layer of a polymeric material;
   positioning the adhesive layer of the adhesive product onto a discontinuity, wherein the adhesive layer sealingly wets the discontinuity; and
   thermally activating the adhesive layer at an elevated temperature,
   wherein the adhesive layer comprises a vulcanizable adhesive,
   wherein a vulcanization of the adhesive layer occurs during the step of thermally activating the adhesive layer,
   wherein the vulcanizable adhesive comprises a polybutadiene-polyurethane and a sulfur-containing vulcanizing agent, and
   further wherein the vulcanization takes place in the presence of at least one vulcanizing agent comprising one or more of sulfur, a sulfur-containing compound, a peroxide and a metal oxide.

2. The method of claim 1, wherein the vulcanizable adhesive is selected such that in a Dynamic Mechanical Analysis (DMA) on a stepwise temperature increase with a sinusoidally oscillating shear stress with a deformation frequency of 10 rad/s, the loss modulus G" and the shear modulus G' on transition from the rubber-elastic range into the fluid range, at a temperature $T_{Erw,K}$ which lies below the highest process temperature $T_{P,max}$ attained during the method, adopt the same value at not more than 100° C.

3. The method of claim 2, wherein the vulcanizable adhesive is selected such that the temperature $T_{Erw,K}$ lies not lower than 20° C.

4. The method of claim 1, wherein the vulcanizable adhesive is admixed with rheology modifiers comprising one or more of polyamide waxes, phyllosilicates, fumed silica, precipitated silica, castor oil derivatives, modified castor oil derivatives, polyolefins, and combinations thereof.

5. The method of claim 1, wherein the vulcanizable adhesive comprises one or more rubbers selected from the group consisting of natural rubber, isoprene-based synthetic rubbers, ethylene-propylene-based rubbers, butadiene-based rubbers, and silicone-based rubbers.

6. The method of claim 1, wherein the vulcanizable adhesive comprises one or more of vulcanization accelerators, coagents, fillers, epoxy resins, tackifier resins, bitumen, plasticizers, and further auxiliaries and adjuvants.

7. The method of claim 1, wherein the polymeric material of the film layer is selected such that in a Dynamic Mechanical Analysis (DMA) on a stepwise temperature increase with a sinusoidally oscillating shear stress with a deformation frequency of 10 rad/s, the loss modulus G" and the shear modulus G' on transition from the rubber-elastic range into the fluid range, at a temperature $T_{Erw,F}$ which lies below the highest process temperature $T_{P,max}$ attained during the method, adopt the same value at not more than 200° C.

8. The method of claim 7, wherein the polymeric material of the film layer is selected such that the temperature $T_{Erw,F}$ lies not lower than 70° C.

9. The method of claim 1, wherein the film layer has a melt viscosity at 160° C. of 50 Pa·s to 350 Pa·s, as ascertained from a measurement according to a DIN EN ISO 1133-1 test.

10. The method of claim 1, wherein the polymeric material for the film layer has a melt Mass-Flow Rate (MFR) of 20 g/10 min to 150 g/10 min, as measured according to a DIN EN ISO 1133-1 test at 160° C./2.16 kg.

11. The method of claim 1, wherein a film of the polymeric material of the film layer has an elongation at break of 150% or more, as measured according to ISO 527-3 in conjunction with ISO 527-1 No. 3.7.2 at 50 mm/min and 23° C.

12. The method of claim 1, wherein the polymeric material of the film layer has a water absorption of less than 5 wt %, as measured according to a DIN EN ISO 62 test.

13. The method of claim 1, wherein a film of the polymeric material of the film layer exhibits a detachment of not more than 15% of an area of the film, as measured according to an ASTM D3359 cross-hatch test.

14. The method of claim 1, wherein a film of the polymeric material of the film layer exhibits a detachment of not more than 15% of an area of the film, as measured after storage of the film for 240 hours at 40° C. in 100% relative humidity according to an ASTM D3359 cross-hatch test.

15. The method of claim 1, wherein a film of the polymeric material of the film layer exhibits no blistering, as measured after storage of the film for 240 hours at 40° C. in 100% relative humidity according to a DIN EN ISO 4628-2 (blistering) test.

16. The method of claim 1, wherein the polymeric material of the film layer comprises reactive resins.

17. The method of claim 1, wherein the polymeric material of the film layer comprises one or more of dyes, lubricants, plasticizers, antiblocking agents, light stabilizers, UV stabilizers, hydrolysis stabilizers, temperature stabilizers, rheology modifiers, crosslinkers and fillers.

18. A method for sealing discontinuities in vehicle bodywork, comprising:
   providing an at least two-layered adhesive product which comprises at least one thermally activatable adhesive layer and a film layer of a polymeric material;
   positioning the adhesive layer of the adhesive product onto a discontinuity, wherein the adhesive layer sealingly wets the discontinuity; and
   thermally activating the adhesive layer at an elevated temperature,
   wherein the adhesive layer comprises a vulcanizable adhesive,
   wherein a vulcanization of the adhesive layer occurs during the step of thermally activating the adhesive layer, and
   further wherein the vulcanizable adhesive comprises a polybutadiene-polyurethane and a sulfur-containing vulcanizing agent.

19. The method of claim 18, wherein the polybutadiene-polyurethane comprises the chemical reaction product of:
   at least one polybutadiene diol,
   at least one chain extender having a hydroxyl functionality of two and a molar mass of less than or equal to 300 g/mol, and
   optionally at least one polybutadiene polyol having a number-average mean functionality of between greater than 2.0 and less than or equal to 3.0,
   with at least one aliphatic or alicyclic diisocyanate.

20. The method of claim 1, wherein the polybutadiene-polyurethane comprises the chemical reaction product of:
   at least one polybutadiene diol,
   at least one chain extender having a hydroxyl functionality of two and a molar mass of less than or equal to 300 g/mol, and optionally at least one polybutadiene polyol having a number-average mean functionality of between greater than 2.0 and less than or equal to 3.0,
with at least one aliphatic or alicyclic diisocyanate.

* * * * *

UNITED STATES PATENT AND TRADEMARK OFFICE
CERTIFICATE OF CORRECTION

PATENT NO. : 11,958,995 B2
APPLICATION NO. : 16/646367
DATED : April 16, 2024
INVENTOR(S) : Dietze et al.

Page 1 of 1

It is certified that error appears in the above-identified patent and that said Letters Patent is hereby corrected as shown below:

In the Specification

Column 5, Line 65:
"δphase" should be — δ=phase —.

Column 46, Line 52:
-- (190°) -- should be inserted after — 2.5 —.

Signed and Sealed this
Second Day of July, 2024

Katherine Kelly Vidal
*Director of the United States Patent and Trademark Office*